United States Patent
Nakamura et al.

(10) Patent No.: US 6,785,124 B2
(45) Date of Patent: Aug. 31, 2004

(54) CAPACITOR ELEMENT FOR SOLID ELECTROLYTIC CAPACITOR, PROCESS OF MAKING THE SAME AND SOLID ELECTROLYTIC CAPACITOR UTILIZING THE CAPACITOR ELEMENT

(75) Inventors: Shinji Nakamura, Kyoto (JP); Takeshi Miura, Kyoto (JP); Hideki Ando, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/437,254

(22) Filed: May 13, 2003

(65) Prior Publication Data

US 2004/0104038 A1 Jun. 3, 2004

(30) Foreign Application Priority Data

May 20, 2002 (JP) ........................................ 2002-144198
Jul. 10, 2002 (JP) ........................................ 2002-201604
Aug. 1, 2002 (JP) ........................................ 2002-224944

(51) Int. Cl.$^7$ ........................... H01G 4/228; H01G 9/00
(52) U.S. Cl. ...................................... 361/533; 361/540
(58) Field of Search .................................. 361/523–524, 361/528–529, 532–533, 535–540

(56) References Cited

U.S. PATENT DOCUMENTS 3,956,819 A * 5/1976 Augeri ...................... 29/25.03
4,791,532 A * 12/1988 Gouvernelle et al. ....... 361/529
5,629,830 A   5/1997 Yamagami et al.

FOREIGN PATENT DOCUMENTS

| JP | 60-220922 |   | 11/1985 |   |          |
|----|-----------|---|---------|---|----------|
| JP | 2-105513  |   | 4/1990  |   |          |
| JP | 2-263424  | * | 10/1990 |   | H01G/9/05 |
| JP | 7-320983  |   | 12/1995 |   |          |
| JP | 2000-348975 |   | 12/2000 |   |          |
| JP | 2001-110688 | * | 4/2001 |   | H01G/9/04 |

* cited by examiner

Primary Examiner—Dean A. Reichard
Assistant Examiner—Eric Thomas
(74) Attorney, Agent, or Firm—Merchant & Gould P.C.

(57) ABSTRACT

A capacitor element includes an anode chip body formed by sintering valve metal powder, an anode wire projecting from an end surface of the anode chip body, and a ring member made of a water-repellent thermoplastic synthetic resin and fitted around a root portion of the anode wire connected to the anode chip body. The ring member is fitted and attached to the anode wire. The ring member adheres closely to both of the anode chip body and the anode wire without a gap by thermally melting the ring member in its fitted state around the anode wire.

7 Claims, 18 Drawing Sheets

PRIOR ART

PRIOR ART

PRIOR ART

PRIOR ART

PRIOR ART

CAPACITOR ELEMENT FOR SOLID ELECTROLYTIC CAPACITOR, PROCESS OF MAKING THE SAME AND SOLID ELECTROLYTIC CAPACITOR UTILIZING THE CAPACITOR ELEMENT

BACKGROUND OF THE INVENTION

1. Field of the Invention

Typical solid electrolytic capacitors are generally divided into such a solid electrolytic capacitor 100 as disclosed in JP-A-60-220922 and shown in FIG. 1, and such a solid electrolytic capacitor 200 with a safety fuse as disclosed in JP-A-2-105513 and shown in FIG. 2.

2. Description of the Related Art

The former solid electrolytic capacitor 100 includes a capacitor element 1 arranged between a pair of lead terminals 5 and 6. The capacitor element comprises a porous anode chip body 2 formed by compacting and sintering valve (valve action) metal powder, an anode wire 3 made of valve metal powder and fixedly connected to one end surface 2a of the anode chip body 2, and a cathode electrode film 4 formed on the anode chip body 2 via a dielectric film and a solid electrolyte layer. In setting the capacitor element 1, the anode wire 3 of the capacitor element 1 is connected to the anode lead terminal 5 by welding for example, whereas the cathode lead terminal 6 is electrically connected directly to the cathode electrode film 4 of the capacitor element 1. These components are sealed in a package 7 made of synthetic resin.

Similarly, the latter solid electrolytic capacitor 200 with a safety fuse includes a capacitor element 1 arranged between a pair of lead terminals 5 and 6. The capacitor element comprises a porous anode chip body 2 formed by compacting and sintering valve metal powder, an anode wire 3 made of valve metal powder and fixedly connected to one end surface 2a of the anode chip body 2, and a cathode electrode film 4 formed on the anode chip body 2 via a dielectric film and a solid electrolyte layer. In setting the capacitor element 1, the anode wire 3 of the capacitor element 1 is connected to the anode lead terminal 5 by welding for example. The cathode electrode film 4 of the capacitor element 1 is electrically connected to the cathode lead terminal 6 via a safety fuse wire M which melts and breaks due to overcurrent or temperature increase. These components are sealed in a package 9 made of synthetic resin.

Conventionally, a capacitor element for such solid electrolytic capacitors is manufactured by the following method.

Firstly, as shown in FIG. 3, valve metal powder such as tantalum is compacted into a porous anode chip body 2 so that an anode wire 3 made of valve metal such as tantalum projects from one end surface of the anode chip body 2 and then sintered. Subsequently, as shown in FIG. 4, the porous anode chip body 2 is immersed in a chemical solution A such as an aqueous solution of phosphoric acid with one end surface 2a of the anode chip body 2 oriented upward. In this state, anodization is performed by applying direct current across an electrode B in the chemical liquid A and the anode wire 3. As a result, a dielectric film 2b of tantalum pentoxide, for example, is formed on the surfaces of metal particles of the anode chip body 2. At that time, a dielectric film of tantalum pentoxide, for example, is formed also on a root portion of the anode wire 3 connected to the anode chip body 2.

Then, as shown in FIG. 5, the anode chip body 2 is immersed in an aqueous solution C of manganese nitrate with the end surface 2a of the anode chip body 2 oriented upward. After the aqueous solution of manganese nitrate C infiltrates into the anode chip body 2, the anode chip body is pulled out of the solution of manganese nitrate C and baked. These process steps are repeated a plurality of times. As a result, a solid electrolyte layer 4a of metal oxide such as manganese dioxide is formed on the dielectric film 2b of the anode chip body 2.

Subsequently, the cathode electrode film 4 comprising a graphite layer as a base layer and a metal layer of e.g. silver or nickel as an upper layer is formed over the solid electrolyte layer 4a on the surface of the anode chip body 2 except for the end surface 2a.

When the solid electrolyte layer 4a of metal oxide such as manganese dioxide is formed in the above-described manufacturing process of a capacitor element, the solution of manganese nitrate C rises onto the surface of the root portion of the anode wire 3 connected to the anode chip body 2. Therefore, the solid electrolyte layer of manganese dioxide or the like is formed also at the root portion as connected to the solid electrolyte layer 4a of the anode chip body 2. Therefore, in assembling the capacitor element 1 into a complete solid electrolytic capacitor 100, 200, when the anode wire 3 is connected to an anode lead terminal 5 made of a metal plate by e.g. welding, the solid electrolyte layer formed on the root portion of the metal wire 3 may come into contact with the anode lead terminal 5, which may cause electrical short and often result in product failure.

Conventionally, therefore, before or after forming the dielectric film 2b of tantalum pentoxide by anodization, a ring member 8 made of a water-repellent synthetic resin such as fluoroplastic is attached around the root portion of the anode wire 3, as disclosed in JP-A-2000-348975 and shown in FIG. 6(a), or a coating 8' as shown in FIG. 6(b) is formed by applying water-repellent synthetic resin dissolved in a solvent to the root portion followed by drying. Then, in such a state as shown in FIG. 6(a) or 6(b), the above-described formation of the solid electrolyte layer 4a by immersing in the aqueous solution of manganese nitrate, pulling out from the solution and baking is performed. In this method, the ring member 8 made of water-repellent synthetic resin or the coating 8' prevents the aqueous solution of manganese nitrate from rising up to the root portion of the anode wire, and hence prevents a solid electrolyte layer from being continuously formed on the root portion of the anode wire 3. Thus, it is possible to reduce the possibility of product failure in assembling in to a completed solid electrolytic capacitor.

However, when the ring member 8 is attached around the root portion of the anode wire 3 as is in the former case (See FIG. 6(a)), a gap is inevitably defined between the lower surface of the ring member 8 and the end surface 2a of the anode chip body 2 due to the irregularity of the end surface 2a. Further, a gap is also defined between the outer circumferential surface of the anode wire 3 and the inner circumferential surface of the ring member 8.

The gap between the outer circumferential surface of the anode wire 3 and the inner circumferential surface of the ring member 8 is formed because the inner diameter of a through-hole of the ring member 8 is made larger than the diameter of the anode wire 3 for easily fitting the ring member 8 around the anode wire 3. Further, fin or the like formed in punching the ring member 8 from a plate material also inevitably causes the formation of the gap.

Therefore, as shown in FIG. 5, when the anode chip body 2 is immersed in a solid electrolyte forming solution such as an aqueous solution of manganese nitrate C or the like for forming the solid electrolyte layer 4a, the solid electrolyte forming solution such as manganese nitrate solution flows into the gap between the lower surface of the ring member 8 and the end surface 2a of the anode chip body 2 by capillary action. Then, the solid electrolyte forming solution passes through the gap between the inner circumferential surface of the ring member 8 and the outer circumferential surface of the anode wire 3 to reach the upper surface side of the ring member 8. Thus, the ring member 8 cannot prevent the rising of manganese nitrate solution perfectly. Since a solid electrolyte layer is formed also on the upper surface side of the ring member 8 of the anode wire 3 as connected to the solid electrolyte layer 4a on the anode chip body 2, the possibility of product failure in assembling into a completed solid electrolytic capacitor is still considerably high.

Moreover, for assembling into a complete solid electrolytic capacitor 100, 200, the anode wire 3 is fixedly connected to an anode lead terminal 5 made of a metal plate by welding for example, as shown in FIG. 7. Therefore, the neck dimensions from the end surface 2a to the anode lead terminal 5 needs to be increased by as much as the amount of the thickness T of the ring member 8. Therefore, in the case where the entire length L of the completed solid electrolytic capacitor 100, 200 is determined in advance, the provision of the ring member 8 makes it impossible to increase the length H of the anode chip body 2 and hence to increase the capacitance. In the case where the capacitance is determined in advance, the entire length L increases by as much as the thickness of the ring member 8, which leads to an increase in size and weight of the capacitor.

Contrary to this, in the latter method (See FIG. 6(b)) in which a coating 8' is formed by applying and drying synthetic resin dissolved in a solvent, the coating 8' can be formed closely to the end surface 2a of the anode chip body 2 and to the outer circumferential surface of the anode wire 3 without defining a gap. Therefore, it is possible to prevent the solid electrolyte forming solution from rising up to the root portion of the anode wire 3 when the anode chip body is immersed in the solvent and hence to prevent the solid electrolyte layer from being formed continuously to the upper side of the coating 8' on the anode wire 3.

However, when the synthetic resin is applied as dissolved in a solvent, the synthetic resin dissolved in the solvent infiltrates deep into the porous structure of the anode chip body 2, where the solid electrolyte layer cannot be formed. Thus, the infiltration of the synthetic resin dissolved in the solvent increases the region where the solid electrolyte layer cannot be formed. In other words, the effective volume of the anode chip body capable of functioning as a capacitor decreases, which results in a decrease of the capacitance. Further, the cost increases largely, because the application of the synthetic resin dissolved in a solvent to the entire circumference of the anode wire is very troublesome. Moreover, as shown in FIG. 8, the projecting height T' of the coating 8' from the end surface 2a of the anode chip body 2 becomes large. Therefore, in assembling into a completed solid electrolytic capacitor 100, 200 shown in FIGS. 1 and 2, the neck dimension S from the end surface 2a of the anode chip body 2 to the anode lead terminal 5 becomes further larger than the case where the ring member 8 is provided. Therefore, an increase in the capacitance of the capacitor is further hindered, and the size and weight is further increased.

Recently, as disclosed in JP-A-7-320983 for example and as shown in FIG. 9, the end surface 2a of the anode chip body 2 is formed with a recess 2c surrounding the anode wire 3, and a water-repellent synthetic resin P as dissolved in a solvent is loaded in the recess.

With such a method, it is possible to reliably prevent the solid electrolyte layer from being formed at the root portion of the anode wire and hence to decrease the neck dimension S in assembling into a completed solid electrolytic capacitor 100, 200 shown in FIGS. 1 and 2. However, since the synthetic resin as dissolved in a solvent is loaded in the recess 2c at the end surface 2a of the anode chip body 2, the synthetic resin infiltrates deep into the porous structure of the anode chip body 2 before it dries. Thus, a decrease in capacitance of the capacitor due to the infiltration of the synthetic resin cannot be avoided.

DISCLOSURE OF THE INVENTION

To attain these technical objects, a capacitor element according to a first aspect of the present invention comprises an anode chip body formed by sintering valve metal powder, an anode wire projecting from an end surface of the anode chip body, and a ring member made of a water-repellent thermoplastic synthetic resin and fitted around a root portion of the anode wire connected to the anode chip body, wherein the ring member is thermally melted in the fitted state around the anode wire.

Further, a process of making a capacitor element according to a first aspect of the present invention comprises the steps of fitting a ring member made of a water-repellent thermoplastic synthetic resin around a root portion of an anode wire connected to an end surface of an anode chip body formed by sintering valve metal powder, thermally melting the ring member fitted around the anode wire, forming a dielectric film on the anode chip body by anodization performed by immersing the anode chip body in a chemical solution, and forming a solid electrolyte layer on the anode chip body by immersing in and pulling out the anode chip body with respect to a solid electrolyte forming solution followed by baking.

A solid electrolytic capacitor according to a first aspect of the present invention comprises a capacitor element disposed between an anode lead terminal and a cathode lead terminal, the capacitor element comprising an anode chip body made by sintering valve metal powder, an anode wire projecting from an end surface of the anode chip body, and a cathode electrode film formed on the anode chip body via a dielectric film and a solid electrolyte layer. The anode wire of the capacitor element is connected to the anode lead terminal whereas the cathode electrode film is electrically connected to the cathode lead terminal. The anode wire has a root portion which is connected to the anode chip body and around which a ring member made of a water-repellent thermoplastic synthetic resin is fitted, and the ring member is thermally melted in its fitted state around the anode wire.

In this way, the ring member mounted to the root portion of the anode wire connected to the anode chip body is heated and melted in the state fitted around the anode wire. As a result, the ring member deforms into a configuration fitting to the end surface of the anode chip body and adheres closely to the end surface without a gap as if thermally fused to the surface while avoiding or considerably reducing filtration into the porous structure of the anode chip body.

Further, the fin produced in punching the ring member from the material plate member disappears by the thermal melting, and the ring member adheres closely also to the outer circumferential surface of the anode wire without a gap as if thermally fused to the surface while reducing the inner diameter of the through-hole.

According to the present invention, therefore, in forming a solid electrolyte layer on the anode chip body, the solid electrolyte forming solution can be reliably prevented from rising to the upper surface side of the ring member. In other words, it is possible to reliably prevent the formation of a solid electrolyte layer at a portion of the anode wire on the upper surface side of the ring member. Therefore, it is possible to greatly reduce the possibility of product failure due to electrical short between the anode lead terminal connected to the anode wire and the solid electrolyte layer without decreasing the capacitance of the capacitor.

Further, since the ring member adheres closely to both of the end surface of the anode chip body and the outer circumferential surface of the anode wire without a gap, it is possible to prevent the dielectric film from being formed at the portion of the end surface of the anode chip body provided with the ring member. Therefore, even when an external force for bending the anode wire is applied to the anode wire in handling as a capacitor element, the occurrence of dielectric breakdown at that portion can be reliably prevented. Thus, it is possible to greatly reduce defective products caused by dielectric breakdown occurring during the manufacturing process as a capacitor element.

Further, according to the present invention, the ring member is simply heated after fitted around the anode wire, and the process is very easy, so that an increase in cost can be suppressed to the minimum. Moreover, the height from the end surface of the anode chip body to the upper surface of the ring member can be suppressed so as not to exceed the initial thickness of the ring member, and variation in height can be reduced. Further, the neck dimension from the end surface of the anode chip body to the anode lead terminal can be decreased in connecting the anode lead terminal to the anode wire for assembling into a complete solid electrolytic capacitor. Therefore, it is possible to prevent an increase in size of the completed solid electrolytic capacitor or a decrease in capacitance of the solid electrolytic capacitor.

Particularly, as defined in claim 2, the ring member may be made of a transparent synthetic resin. In this case, it is possible to confirm, from the outside, whether or not the ring member adheres closely to both of the end surface of the anode chip body and the circumferential surface of the anode wire and whether or not the solid electrolyte forming solution enters between the ring member and the anode chip body or the anode wire in forming the solid electrolyte layer. Therefore, distinguishing between a proper product and a defective product can be easily performed.

Further, as defined in claim 3, the ring member may be formed with a cutout extending radially outward from a through-hole of the ring member to reach an outer circumferential surface of the ring member. With this structure, in fitting the ring member for attachment around the anode wire, the ring member can be fitted to a root portion of the anode wire from the side instead of passing the anode wire into the ring member like skewering. The cutout is filled and disappears when the ring member thermally melts, so that the ring member adheres closely to the entire circumference of the anode wire. Thus, the attachment of the ring member to the anode wire can be easily performed while keeping intended advantages.

Further, as defined in claim 9, the thermal melting of the ring member may be performed in vacuum or in an inert gas atmosphere. In this case, it is possible to reliably prevent or decrease the formation of an oxide film on metal particle surfaces of the anode chip body or on a surface of the anode wire and the change of properties of the dielectric film in thermally melting the ring member.

A capacitor element according to a second aspect of the present invention comprises an anode chip body formed by sintering valve metal powder, an anode wire projecting from an end surface of the anode chip body, and a ring member made of a water-repellent thermoplastic synthetic resin and fitted around a root portion of the anode wire connected to the anode chip body. The ring member has an inner diameter which is larger than the diameter of the anode wire so that the ring member adheres closely to the anode wire when the ring member shrinks due to heat. The ring member is thermally melted in contact with the end surface of the anode chip body.

A process of making a capacitor element according to a second aspect of the present invention comprises the steps of making an anode chip body of valve metal powder while connecting an anode wire to an end surface of the anode chip body, fitting a ring member made of a water-repellent and heat-shrinkable thermoplastic synthetic resin around the anode wire, the ring member having an inner diameter larger than a diameter of the anode wire so that the ring member closely adheres to the anode wire when the ring member thermally shrinks, thermally melting the ring member with the ring member held in contact with the end surface of the anode chip body, forming a dielectric film on the anode chip body by anodization performed by immersing the anode chip body in a chemical solution, and forming a solid electrolyte layer on the anode chip body by immersing in and pulling out of the anode chip body with respect to a. solid electrolyte forming solution followed by baking.

Further, a solid electrolytic capacitor according to a second aspect of the present invention comprises a capacitor element disposed between an anode lead terminal and a cathode lead terminal, the capacitor element comprising an anode chip body made by sintering valve metal powder, an anode wire projecting from an end surface of the anode chip body, and a cathode electrode film formed on the anode chip body via a dielectric film and a solid electrolyte layer. The anode wire of the capacitor element is connected to the anode lead terminal whereas the cathode electrode film is electrically connected to the cathode lead terminal. The anode wire is provided with a ring member made of a water-repellent thermoplastic synthetic resin and fitted around the anode wire, and the ring member has an inner diameter larger than the diameter of the anode wire so that the ring member adheres closely to the anode wire when the ring member thermally shrinks. The ring member is thermally melted in contact with the end surface of the anode chip body.

In this way, by thermally melting the ring member as held in contact with the end surface of the anode chip body, the ring member deforms into a configuration fitting to the irregular end surface of the anode chip body and adheres closely to the end surface without a gap as if thermally fused to the end surface while avoiding or considerably reducing filtration into the porous structure as compared with the case where a synthetic resin dissolved in a solvent is applied.

Further, since the ring member shrinks toward the anode wire by the thermal melting, the ring member adheres closely also to the outer circumferential surface of the anode wire without a gap as if thermally fused thereto. In this case, since the inner diameter of the ring member is larger than the diameter of the anode wire, it is possible to alleviate the rising of an inner peripheral portion of the ring member toward the upper surface side of the ring member due to the shrinkage toward the anode wire after having closely adhered to the anode wire. In other words, the height of the ring member from the end surface of the anode chip body can be reliably prevented from increasing due to thermal shrinkage.

According to the present invention, therefore, in forming a solid electrolyte layer on the anode chip body, the solid electrolyte forming solution can be reliably prevented from rising to the upper surface side of the ring member through a gap between the ring member and the anode chip body or the anode wire. In other words, it is possible to reliably prevent a solid electrolyte layer from being formed at a portion of the anode wire on the upper surface side of the ring member. Therefore, it is possible to greatly reduce the possibility of product failure due to electrical short between the anode lead terminal connected to the anode wire and the solid electrolyte layer in assembling into a complete solid electrolytic capacitor. At that time, the effective volume of the anode chip body capable of functioning as a capacitor is prevented from reducing.

Further, since the projecting height of the ring member from the end surface of the anode chip body can be decreased, the neck dimension from the end surface of the anode chip body to the anode lead terminal can be decreased in assembling the capacitor element into a complete solid electrolytic capacitor. Therefore, in the case where the entire length of the completed solid electrolytic capacitor is determined in advance, the length of the anode chip body can be increased by as much as the decreased amount of the neck dimension, thereby increasing the capacitance of the capacitor. In the case where the capacitance is determined in advance, the entire length of the solid electrolytic capacitor can be shortened by as much as the decreased amount of the neck dimension, thereby decreasing the size and weight of the capacitor.

Particularly, as defined in claim 5, the inner diameter of the ring member may be 1.20–1.60 times the diameter of the anode wire. In this case, it is possible to cause the ring member to closely adhere to both of the end surface of the anode chip body and the outer circumferential surface of the anode wire without a gap, while making the projecting height of the ring member from the end surface of the anode chip body smaller than the original thickness of the ring member. Thus, the above-described advantages can be further promoted.

A capacitor element according to a third aspect of the present invention comprises an anode chip body formed by sintering valve metal powder, an anode wire projecting from an end surface of the anode chip body, and a ring member made of a water-repellent thermoplastic synthetic resin and fitted around a root portion of the anode wire connected to the anode chip body. The end surface of the anode chip body is formed with a recess surrounding the anode wire, and at least part of the ring member is loaded in the recess by thermal melting.

Further, a process of making a capacitor element according to a third aspect of the present invention comprises the steps of making an anode chip body of valve metal powder having an end surface formed with a recess for surrounding an anode wire connected to the end surface, fitting a ring member made of a water-repellent thermoplastic synthetic resin around the anode wire, thermally melting the ring member so that at least part of the ring member is loaded in the recess, forming a dielectric film on the anode chip body by anodization performed by immersing the anode chip body in a chemical solution, and forming a solid electrolyte layer on the anode chip body by immersing in and pulling out of the anode chip body with respect to a solid electrolyte forming solution followed by baking.

Further, a solid electrolytic capacitor according to a third aspect of the present invention comprises a capacitor element disposed between an anode lead terminal and a cathode lead terminal, the capacitor element comprising an anode chip body made by sintering valve metal powder, an anode wire projecting from an end surface of the anode chip body, and a cathode electrode film formed on the anode chip body via a dielectric film and a solid electrolyte layer. The anode wire of the capacitor element is connected to the anode lead terminal whereas the cathode electrode film is electrically connected to the cathode lead terminal. The anode wire is provided with a ring member made of a water-repellent thermoplastic synthetic resin and fitted around the anode wire. The end surface of the anode chip body is formed with a recess surrounding the anode wire, and at least part of the ring member is loaded in the recess by thermal melting.

In the present invention, the recess provided at the end surface of the anode chip body is filled with at least part of the ring member thermally melted, not with synthetic resin dissolved in a solvent. Therefore, it is possible to cause the ring member to closely adhere to both of the anode chip body and the anode wire without a gap and as if thermally fused thereto while preventing or lessening infiltration of synthetic resin into the porous structure of the anode chip body.

Further, the projecting height of the ring member from the end surface of the anode chip body can be made smaller than the original thickness of the ring member by as much as the amount of the part of the ring member loaded in the recess.

According to the present invention, therefore, in forming a solid electrolyte layer on the anode chip body, the solid electrolyte forming solution can be reliably prevented from rising to the upper surface side of the ring member through a gap between the ring member and the anode chip body or the anode wire. In other words, it is possible to reliably prevent a solid electrolyte layer from being formed at a portion of the anode wire on the upper surface side of the ring member. Therefore, it is possible to greatly reduce the possibility of product failure due to electrical short between the anode lead terminal connected to the anode wire and the solid electrolyte layer in assembling the capacitor element into a complete solid electrolytic capacitor. At that time, the effective volume of the anode chip body capable of functioning as a capacitor is prevented from reducing.

Further, since the projecting height of the ring member from the end surface of the anode chip body can be decreased, the neck dimension from the end surface of the anode chip body to the anode lead terminal can be decreased in assembling the capacitor element into a complete solid electrolytic capacitor. Therefore, in the case where the entire length of the completed solid electrolytic capacitor is determined in advance, the length of the anode chip body can be increased by as much as the decreased amount of the neck dimension, thereby increasing the capacitance of the capacitor. In the case where the capacitance is determined in advance, the entire length of the solid electrolytic capacitor can be shortened by as much as the decreased amount of the neck dimension, thereby decreasing the size and weight of the capacitor.

Particularly, as defined in claim 7, the recess may have a depth which is generally equal to the thickness of the ring member. In this case, the ring member does not project from the end surface of the anode chip body almost at all so that the neck dimension can be further reduced, which promotes the above-described advantages.

DETAILED DESCRIPTION OF THE PREFERRED EMBODIMENTS

Hereinafter, a capacitor element 11 according to a first embodiment of the present invention, which is applied to a tantalum solid electrolytic capacitor, will be described with reference to the accompanying drawings (FIGS. 10–15).

Figure 10:
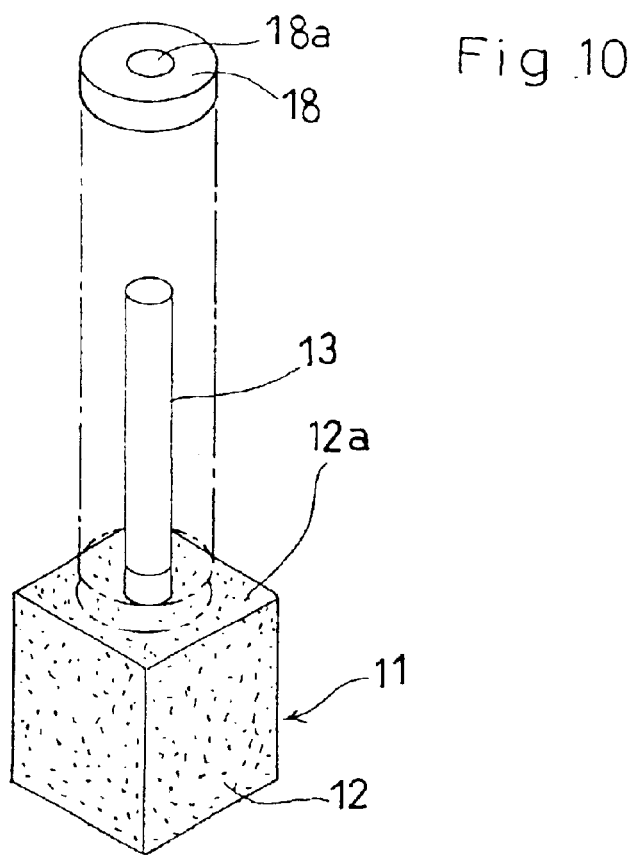
FIG. 10 is a perspective view illustrating an anode chip body and a ring member in a first embodiment.

First, as shown in FIG. 10, tantalum powder is compacted into a porous anode chip body 12 and sintered, while anode wire 13 of tantalum is provided to project from an end surface 12a of the anode chip body 12.

Figure 11:
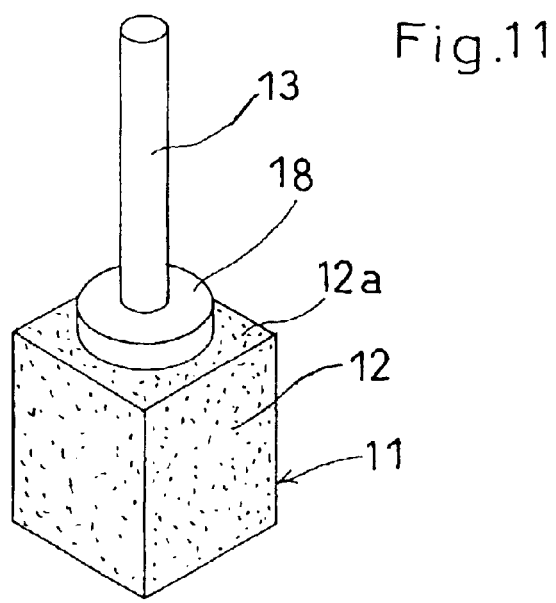
FIG. 11 is a perspective view illustrating the ring member as fitted around the anode wire of the anode chip body in the first embodiment.
Figure 12:
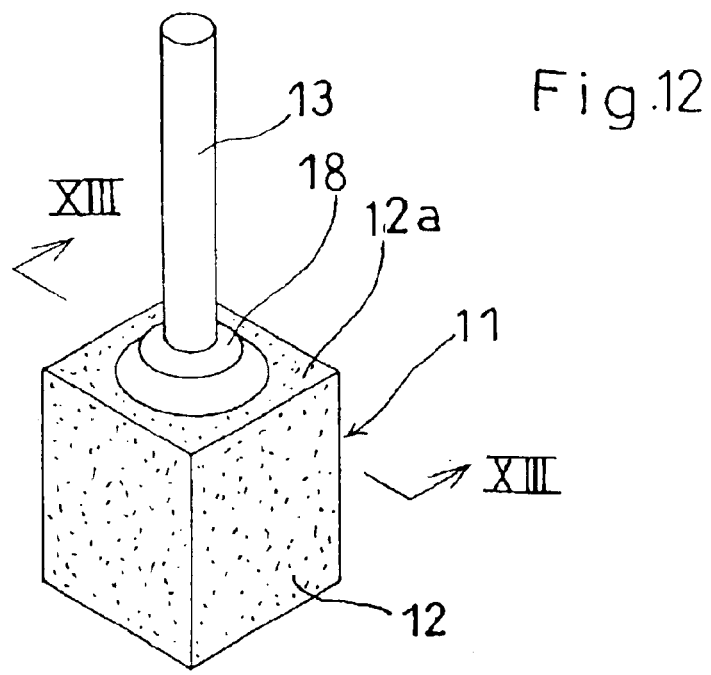
FIG. 12 is a perspective view illustrating the state after the ring member fitted around the anode wire is thermally melted in the first embodiment.
Figure 13:
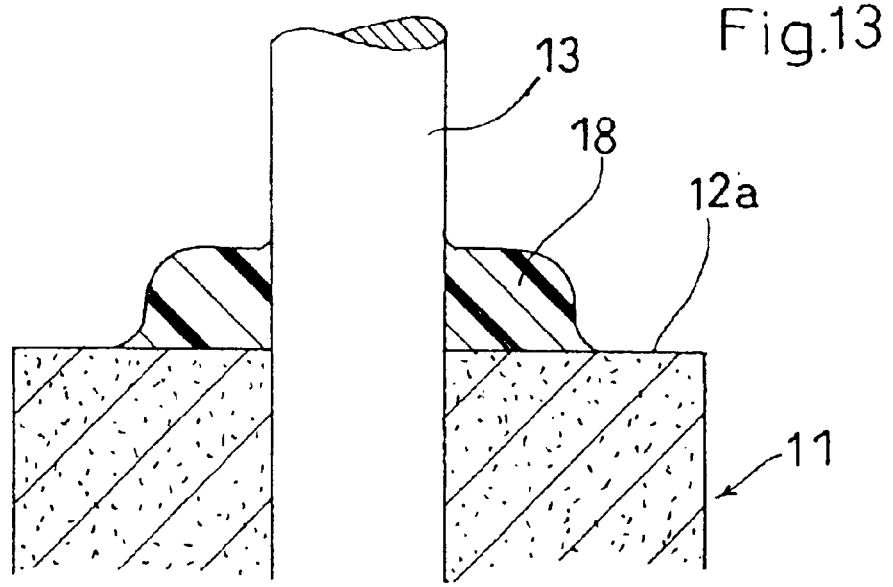
FIG. 13 is an enlarged perspective view taken along lines XIII—XIII in FIG. 12.

On the other hand, a ring member 18 with a through-hole 18a as shown in FIG. 10 is formed by punching a plate member made of water-repellent transparent thermoplastic synthetic resin such as fluoroplastic having a melting point of about 270° C. for example. As shown in FIG. 11, with respect to the anode chip body 12 which has undergone an anodization process, the ring member 18 is fitted around a root portion of the anode wire 3 connected to the end surface 12a of the anode chip body 12.

Subsequently, the entirety of the anode chip body 12 is put in a non-illustrated closed container and heated to a temperature equal to or higher than the melting point of the synthetic resin forming the ring member 18, or specifically to about 270–300° C. while maintaining the inside of the closed container under vacuum or in an atmosphere of inert gas such as nitrogen gas or argon gas. After maintaining the temperature for about 30 minutes, cooling to ordinary temperature is performed.

By the heating, the ring member 18 temporarily melts to deform into a configuration fitting to the end surface 12a of the anode chip body 12 and hence adheres closely to the end surface 12a of the anode chip body 12 without a gap as if thermally fused to the surface.

In this case, since the ring member 18 is thermally melted, the filtration of the molten synthetic resin into the porous structure of the anode chip body 12 can be prevented or considerably reduced.

Further, when the ring member 18 is heated and melted, fin produced in punching the ring member 8 from the material plate member disappears. Moreover, the inner diameter of the through-hole 18a shrinks toward the anode wire 13, so that the ring member adheres closely to the entire outer circumference of the anode wire 13 without a gap as if thermally fused to the circumferential surface (See FIGS. 12 and 13).

Figure 4:
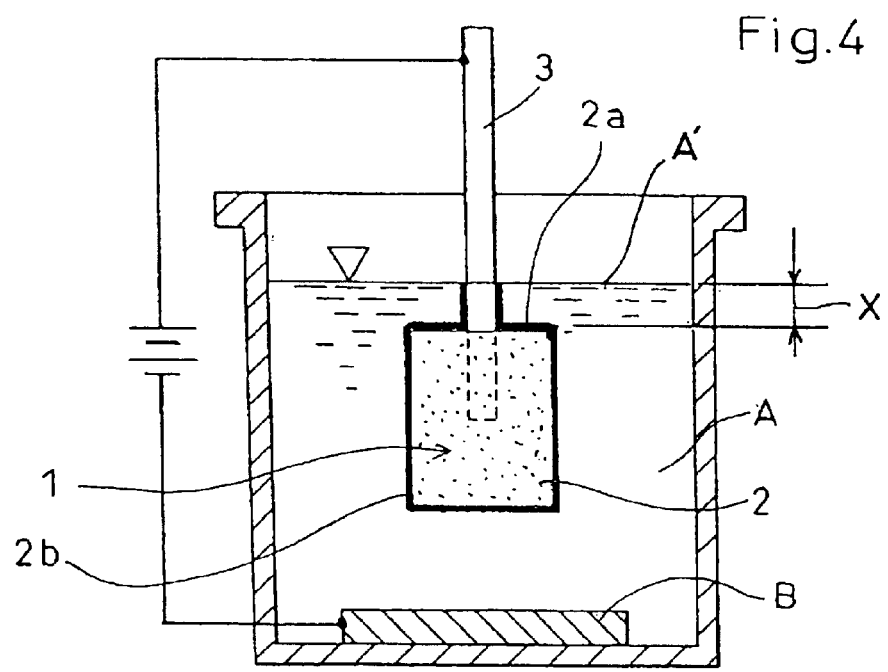
FIG. 4 illustrates anodization for forming a dielectric film on an anode chip body.

Subsequently, as shown in FIG. 4, the anode chip body 12 is immersed in a chemical solution A such as an aqueous solution of phosphoric acid so that the end surface 2a of the anode chip body 2 sinks to the depth X from the liquid level. In this state, anodization is performed by applying direct current across an electrode B in the chemical solution A and the anode wire 3. As a result, a dielectric film of tantalum pentoxide, for example, is formed on the surfaces of metal particles of the anode chip body 12. At that time, a dielectric film of tantalum pentoxide is formed also at the root portion of the anode wire 13 having the length X and connected to the anode chip body 12.

The anodization process for forming the dielectric film may be performed before attaching and thermally melting the ring member 18.

Figure 5:
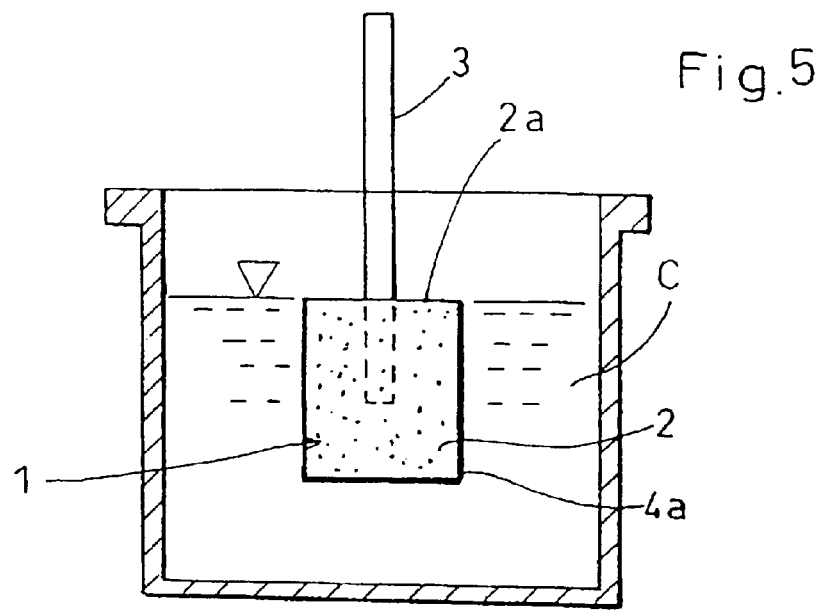
FIG. 5 illustrates formation of a solid electrolyte layer on the anode chip body.
Figure 6:
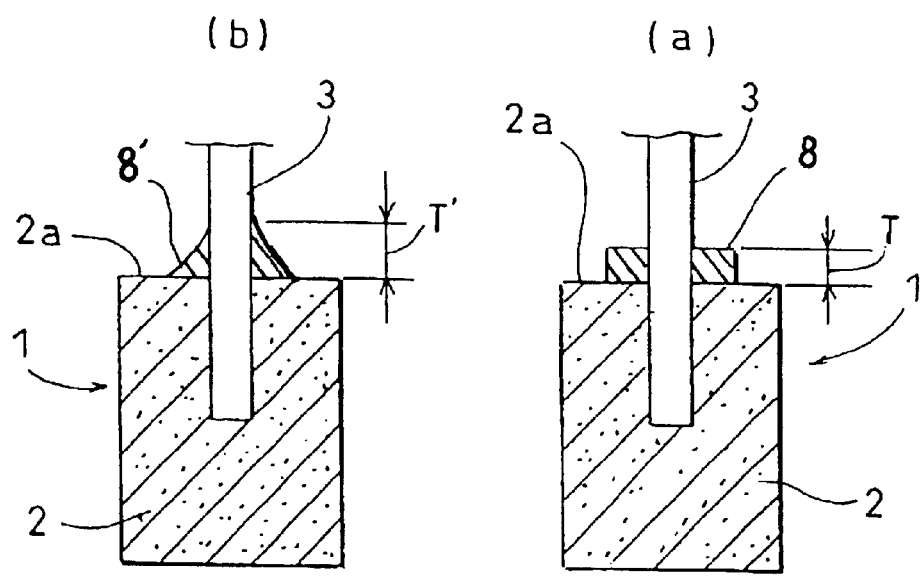
FIGS. 6(a) and 6(b) are vertical sections, as viewed from the front side, illustrating a coating or a ring member of synthetic resin provided at an anode wire of an anode chip body in a prior art method.
Figure 7:
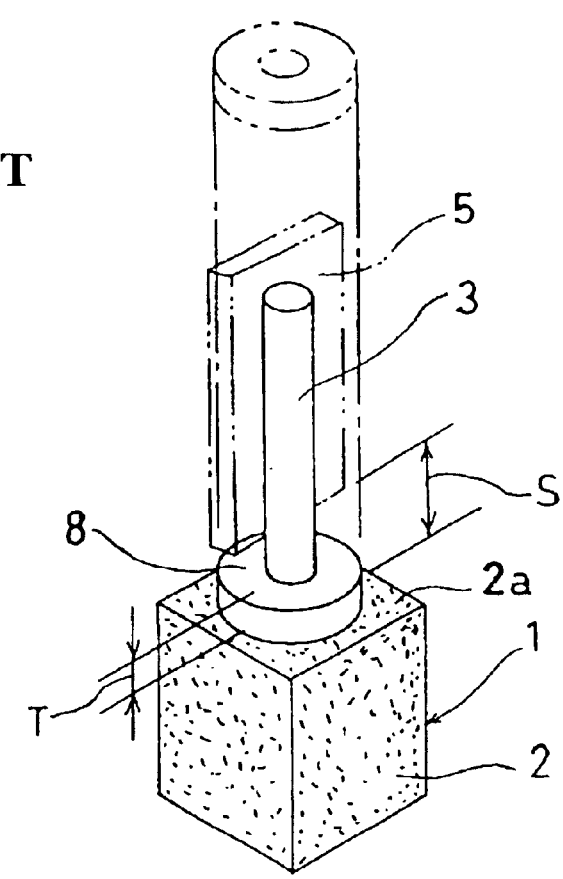
FIG. 7 is a perspective view showing positional relationship between the ring member attached to the anode wire of the anode chip body and an anode lead terminal in the prior art method.
Figure 8:
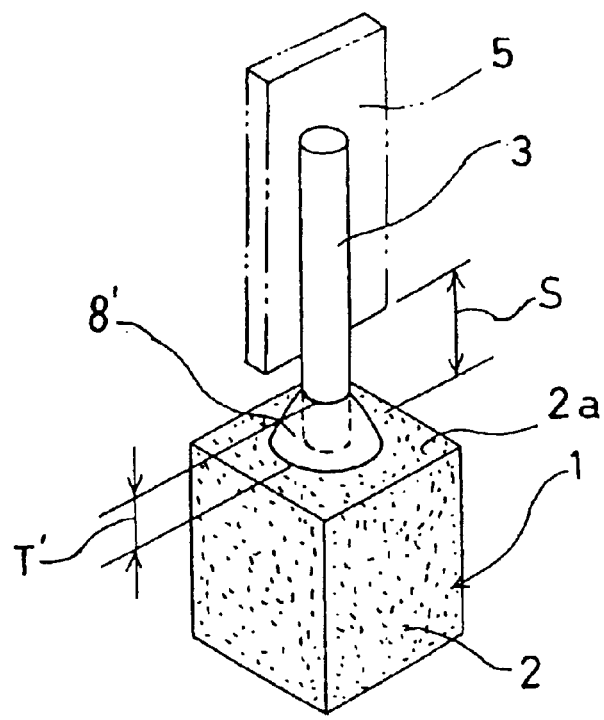
FIG. 8 is a perspective view showing positional relationship between the coating provided at the anode wire of the anode chip body and an anode lead terminal in the prior art method.
Figure 9:
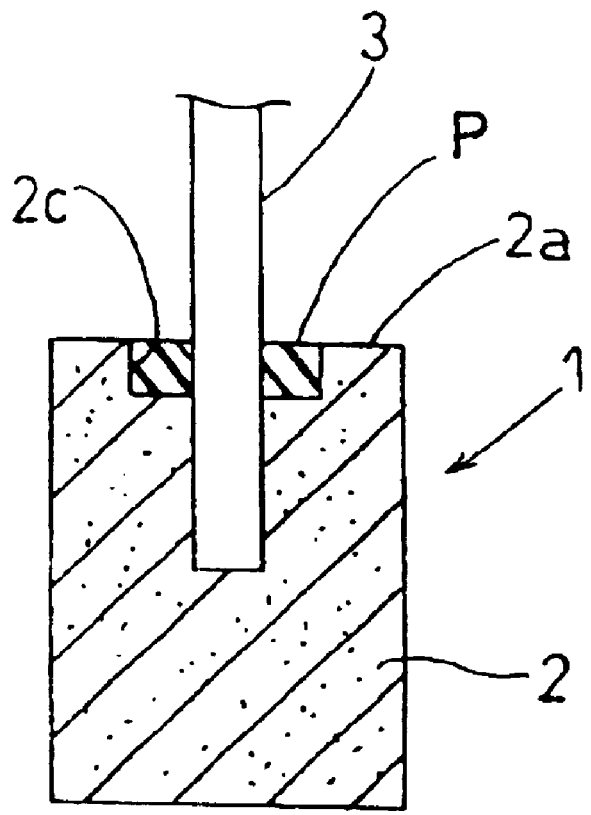
FIG. 9 is a vertical section, as viewed from the front side, illustrating a recess provided around a root portion of an anode wire of an anode chip body and filled with synthetic resin in a prior art method.
Figure 14:
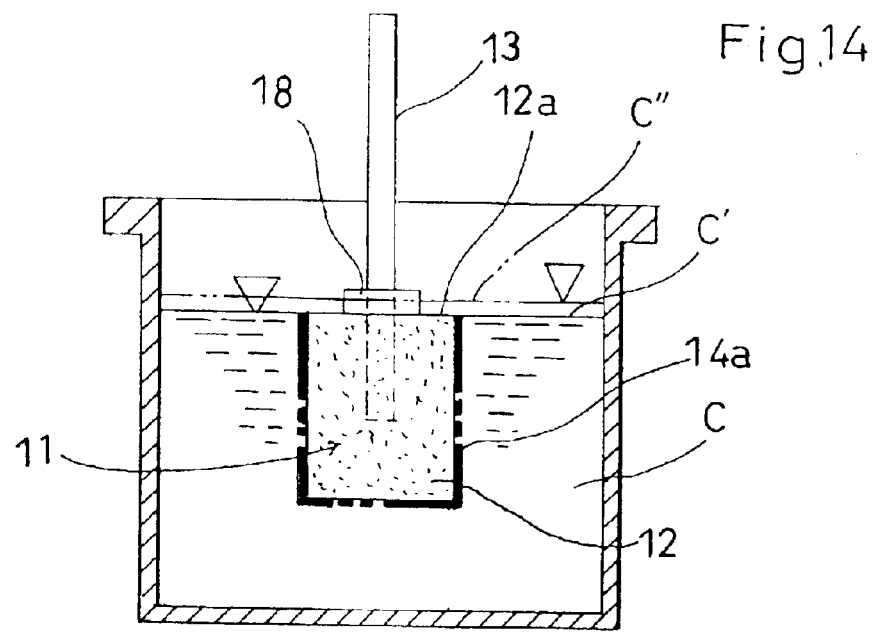
FIG. 14 illustrates formation of a solid electrolyte layer on the anode chip body in the first embodiment.

Subsequently, similarly to the prior art method (See FIG. 5), the anode chip body 12 is immersed in an aqueous solution of manganese nitrate C so that the end surface 12a of the anode chip body 2 oriented upward becomes generally flush with the liquid level C', as shown in FIG. 14. Then, after the aqueous solution of manganese nitrate C infiltrates into the anode chip body 12, the anode chip body is pulled out of the aqueous solution of manganese nitrate C and baked. This process is repeated a plurality of times. As a result, a solid electrolyte layer 14a of metal oxide such as manganese dioxide is formed on the dielectric film of the anode chip body 12.

As described above, the ring member 18 fitted around the root portion of the anode wire 13 projecting from the end surface 12a of the anode chip body 12 and thermally melted in the fitted state adheres closely to both of the end surface 12a of the anode chip body 12 and the outer circumferential surface of the anode wire 13. Therefore, in forming the solid electrolyte layer 14a, it is possible to reliably prevent the aqueous solution of manganese nitrate as a solid electrolyte forming solution from passing between the ring member 18 and the end surface 12a of the anode chip body 12 or the outer circumferential surface of the anode wire 13 to reach the upper surface side of the ring member 18. Accordingly, the formation of a solid electrolyte layer also at a portion of the anode wire 13 on the upper surface side of the ring member 18 can be reliably prevented.

Further, the ring member 18 adheres closely to both of the end surface 12a of the anode chip body 12 and the outer circumferential surface of the anode wire 13. Therefore, it is possible to almost perfectly prevent the dielectric film and the solid electrolyte layer from being formed at the portion of the end surface 12a of the anode chip body 12 provided with the ring member 18 in forming the dielectric film or the solid electrolytic layer. Therefore, even when an external force for bending the anode wire 13 is applied to the anode wire in handling as a capacitor element, the occurrence of dielectric breakdown at that portion can be reliably prevented.

Moreover, since the ring member 18 adheres closely to the end surface 12a of the anode chip body 12, it is possible to prevent aqueous solution of manganese nitrate from entering between the ring member and the end surface in forming the solid electrolyte layer. Therefore, in immersing the anode chip body 12 in the aqueous solution of manganese nitrate C, the ring member 18 can be immersed partially so that the liquid level C" of the aqueous solution of manganese nitrate becomes as indicated by the two-dot line in FIG. 14. Thus, the accuracy of the depth in immersing the anode chip body 12 in the aqueous solution of manganese nitrate C can be lowered.

Since the ring member 18 is made of a transparent synthetic resin, it is possible to confirm, from the outside, whether or not the ring member 19 adheres closely to both of the end surface 12a of the anode chip body 12 and the circumferential surface of the anode wire 13, whether or not the aqueous solution of manganese nitrate enters between the ring member 18 and the anode chip body 12 or the anode wire 13 in forming the solid electrolyte layer, and whether or not the chemical solution enters between the ring member 18 and the anode chip body 12 in forming the dielectric film. Therefore, distinguishing between a proper product and a defective product can be easily performed.

Similarly to the prior art method, after the formation of the solid electrolyte layer is completed in this way, a cathode electrode film comprising a graphite layer as a base layer and a metal layer of e.g. silver or nickel as an upper layer is formed on the surface of the anode chip body 12 except for the end surface 12a, thereby providing a complete capacitor element 11.

Figure 1:
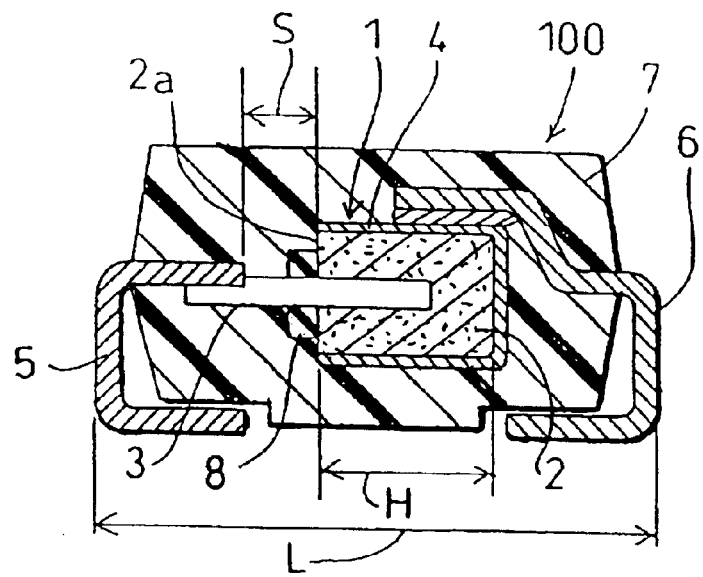
FIG. 1 is a vertical section, as viewed from the front side, illustrating a prior art solid electrolytic capacitor.

Similarly to the prior art solid electrolytic capacitor shown in FIG. 1, the capacitor element 11 thus formed is disposed between a pair of lead terminals for assembling into a solid electrolytic capacitor. In disposing the capacitor element, the anode wire 13 is connected to an anode lead terminal by welding for example, whereas the cathode electrode film 4 is electrically connected directly to the cathode lead terminal, and the entirety is sealed in a package made of synthetic resin.

Figure 2:
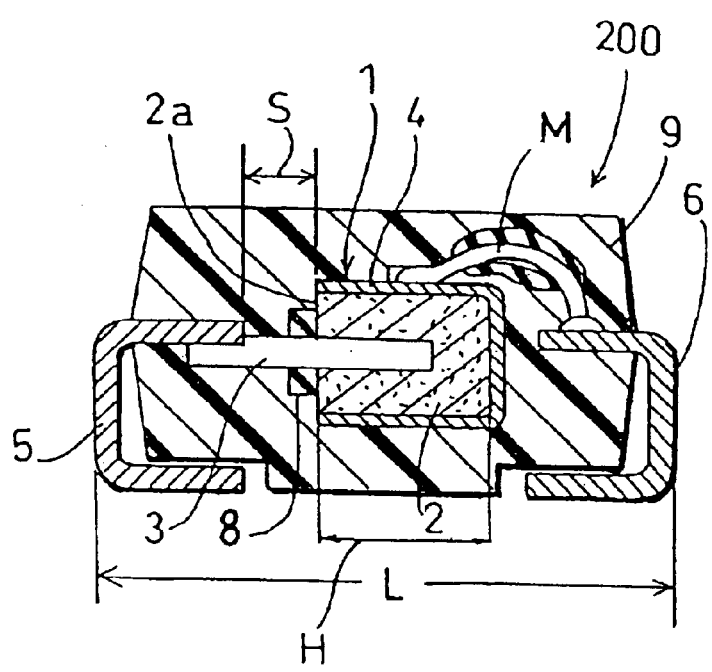
FIG. 2 is a vertical section, as viewed from the front side, illustrating a prior art solid electrolytic capacitor with a safety fuse.
Figure 3:
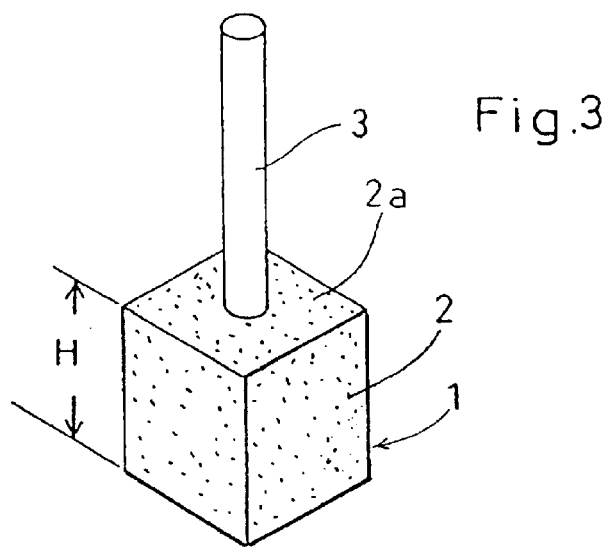
FIG. 3 is a perspective view illustrating an anode chip body of a capacitor element.

Alternatively, similarly to the solid electrolytic capacitor with a safety fuse as shown in FIG. 2, the capacitor element 11 is disposed between a pair of lead terminals for assembling into a solid electrolytic capacitor with a safety fuse. In disposing the capacitor element, the anode wire 13 is connected to an anode lead terminal 15 by welding for example, whereas the cathode electrode film 14 is electrically connected to the cathode lead terminal 6 via a safety fuse wire M, and the entirety is sealed in. a package made of synthetic resin.

Since the baking temperature in forming the solid electrolyte layer is about 230° C. in the first embodiment, it is preferable to make the ring member 18 of a thermoplastic synthetic resin having a melting point higher than the baking temperature.

Since the heating process for temporarily melting the ring member 18 is performed in vacuum or in an atmosphere of inert gas such as nitrogen gas or argon gas, it is possible to prevent or reduce the formation of an oxide film on metal particle surfaces of the anode chip body 12 or on the surface of the anode wire 13 and the change of properties of the dielectric film in the heating process of the ring member 18.

Figure 15:
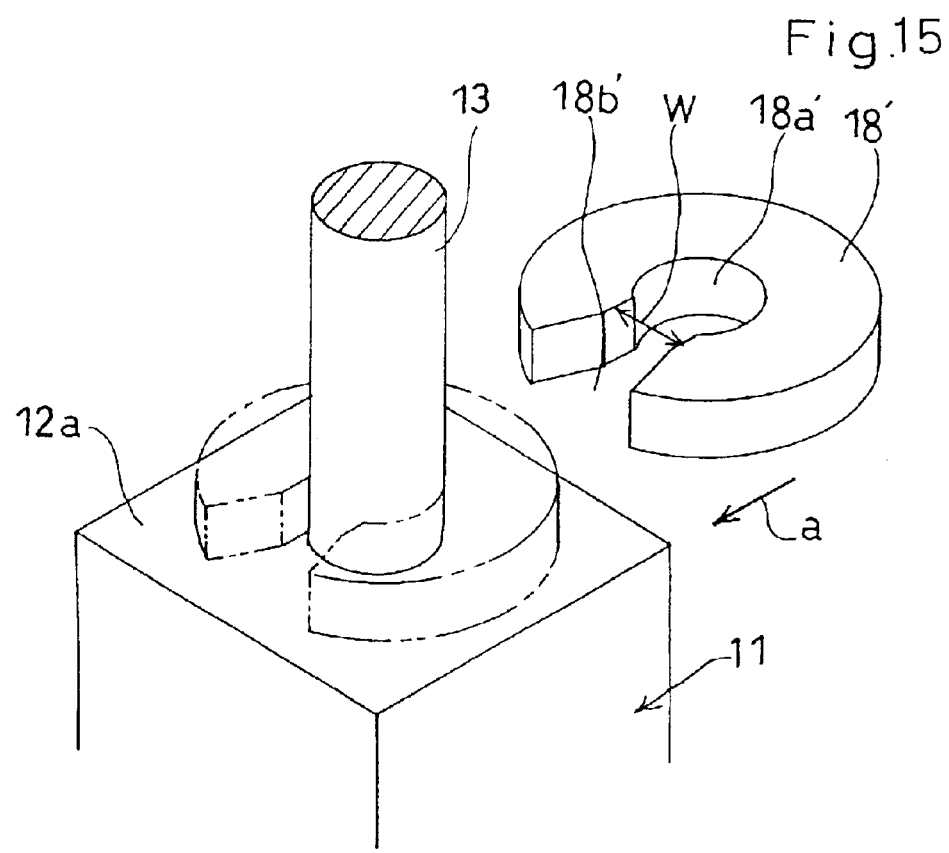
FIG. 15 is a perspective view illustrating a ring member according to a first variation of the first embodiment.

FIG. 15 illustrates another type of ring member 18' as a first variation of the first embodiment of the present invention.

The ring member 18' is formed with a cutout 18b' extending radially outward from the through-hole 18a' to reach the outer circumferential surface.

With this structure, in attaching the ring member 18' to the anode wire 13, the ring member 18' can be fitted to a root portion of the anode wire 13 from the side as indicated by the arrow a in FIG. 15 instead of passing the anode wire 13 into the ring member 18' like skewering. When the ring member 18' thermally melts, the cutout 18b' is filled to disappear, so that the ring member 18' adheres closely to the entire circumference of the anode wire 13. Thus, the attachment of the ring member 18' to the anode wire can be easily performed while keeping intended advantages.

Considering the adherence to the anode wire 13 by thermal melting and the easiness in fitting to the anode wire 13, it is preferable that the cutout 18b' of the ring member 18' has a width W which is equal to or smaller than the diameter of the anode wire 13 at a portion adjoining the through-hole 18a and which is larger than the diameter of the anode wire 13 at a portion at the outer circumference of the ring member 18'.

Next, a capacitor element 21 according to a second embodiment of the present invention, which is applied to a tantalum solid electrolytic capacitor, will be described with reference to the drawings (FIGS. 16–21).

Figure 16:
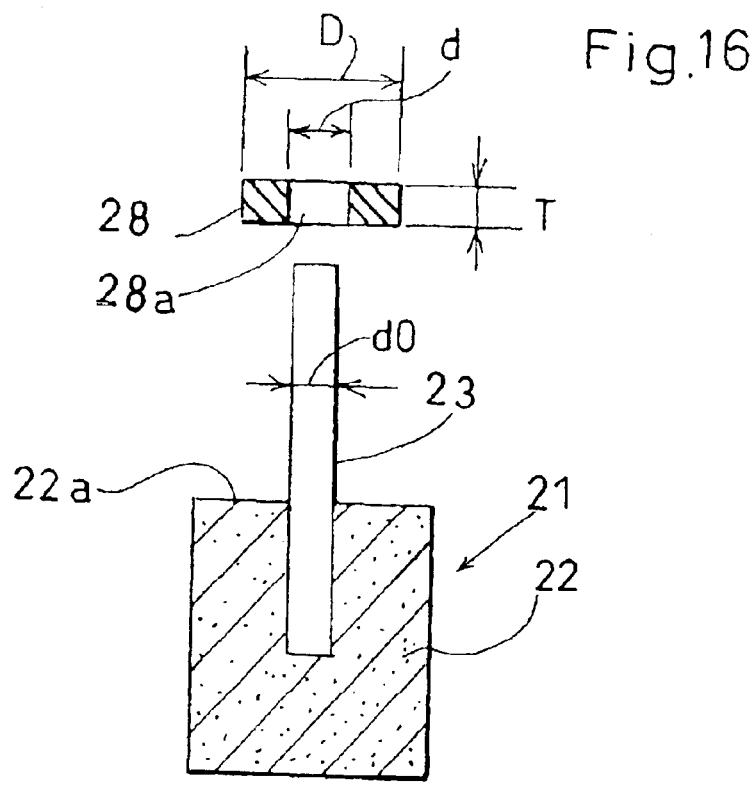
FIG. 16 is a vertical section, as viewed from the front side, illustrating an anode chip body and a ring member in a second embodiment.

First, as shown in FIG. 16, tantalum powder is compacted into a porous anode chip body 22 and sintered, while anode wire 23 of tantalum having a diameter d0 (about 150–200 microns) is provided to project from an end surface 22a of the anode chip body 22.

Figure 17:
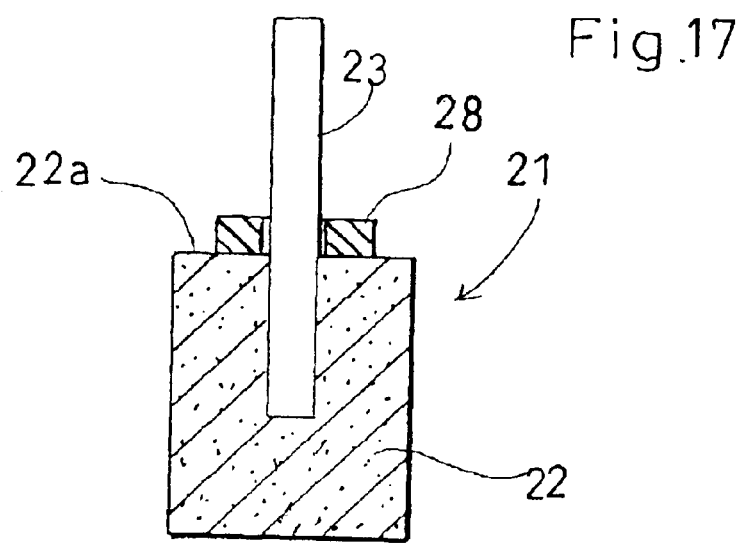
FIG. 17 is a vertical section, as viewed from the front side, illustrating the ring member fitted around the anode wire of the anode chip body in the second embodiment.

On the other hand, as shown in FIG. 16, a ring member 28 having a thickness T (about 100 microns) and a diameter D (about 600 microns) and formed with a through-hole 28z having an inner diameter d is formed by punching a plate member made of a transparent thermoplastic synthetic resin which is water-repellent and heat-shrinkable such as fluoroplastic having a melting point of about 270° C. for example. As shown in FIG. 17, the ring member 28 is fitted around a root portion of the anode wire 23 of the diameter d0 connected to the end surface 22a of the node chip body 22 so that the ring member 28 comes into contact with the end surface 22a.

Subsequently, the anode chip body 12 is put in a non-illustrated closed container with the end surface 22a oriented upward and heated to a temperature equal to or higher than the melting point of the synthetic resin forming the ring member 28, or specifically to about e.g. 270–300° C. for melting the ring member 28 while maintaining the inside of the container under vacuum or in an atmosphere of inert gas such as nitrogen gas or argon gas. After maintaining the melted state for about 30 minutes, cooling to ordinary temperature is performed.

By the thermal melting of the ring member 28, the ring member 28 deforms into a configuration fitting to the irregular end surface 22a of the anode chip body 22 and adheres closely to the end surface 22a of the anode chip body 12 without a gap as if thermally fused to the end surface without filtration or with less filtration into the porous structure of the anode chip body 22 as compared with the case where a synthetic resin dissolved in a solvent is applied. Since the heating also causes the ring member to shrink toward the anode wire 23 while reducing the inner diameter d, the ring member closely adheres also to the outer circumferential surface of the anode wire 23 without a gap as if thermally fused to the surface.

Figure 18:
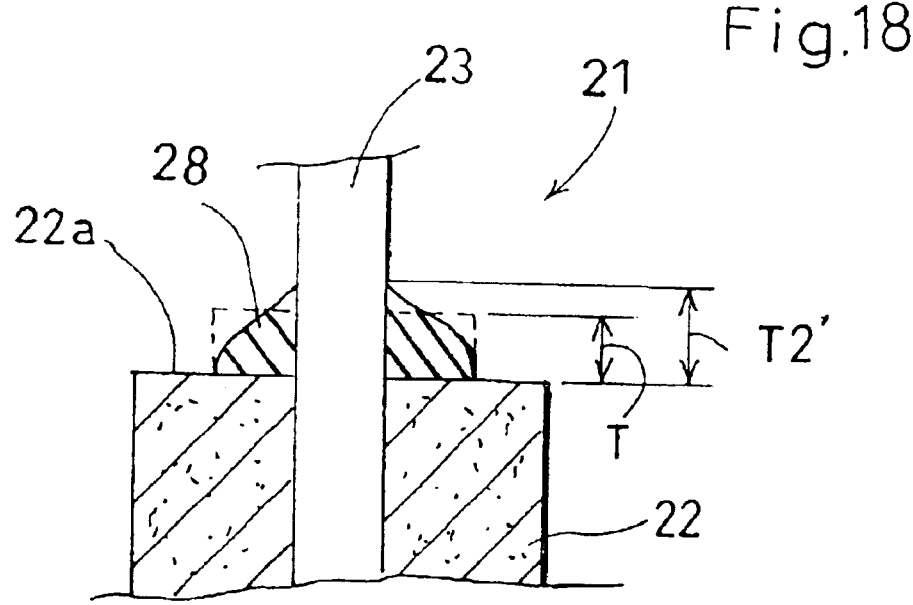
FIG. 18 a vertical section, as viewed from the front side, illustrating the state after the ring member fitted around the anode wire is thermally melted before completion of the structure according to the second embodiment.

As shown in FIG. 18, when the value of the inner diameter d of the ring member 28 is close to the value of the diameter d0 of the anode wire 23, an inner peripheral portion of the ring member 28 closely adhering to the anode wire 23 rises toward the upper surface side of the ring member 28 as the ring member 28 shrinks toward the anode wire 23. Therefore, the projecting height T2' from the end surface 22a of the anode chip body 22 becomes larger than the original height T of the ring member 28.

The rising height of the inner peripheral portion of the ring member 28 is proportional to the dimension of a gab between the inner circumferential surface of the through-hole 28a of the ring member 28 and the outer circumferential surface of the anode wire 23. That is, a smaller gap provides a larger rising height, whereas a larger gap provides a smaller rising height. Therefore, by making the inner diameter d of the ring member 28 larger than the diameter d0 of the anode wire 23, it is possible to alleviate the rising of the inner peripheral portion of the ring member 28 to project toward the upper surface side of the ring member 28 due to shrinkage toward the anode wire 23 after having closely adhered to the anode wire 23.

Figure 19:
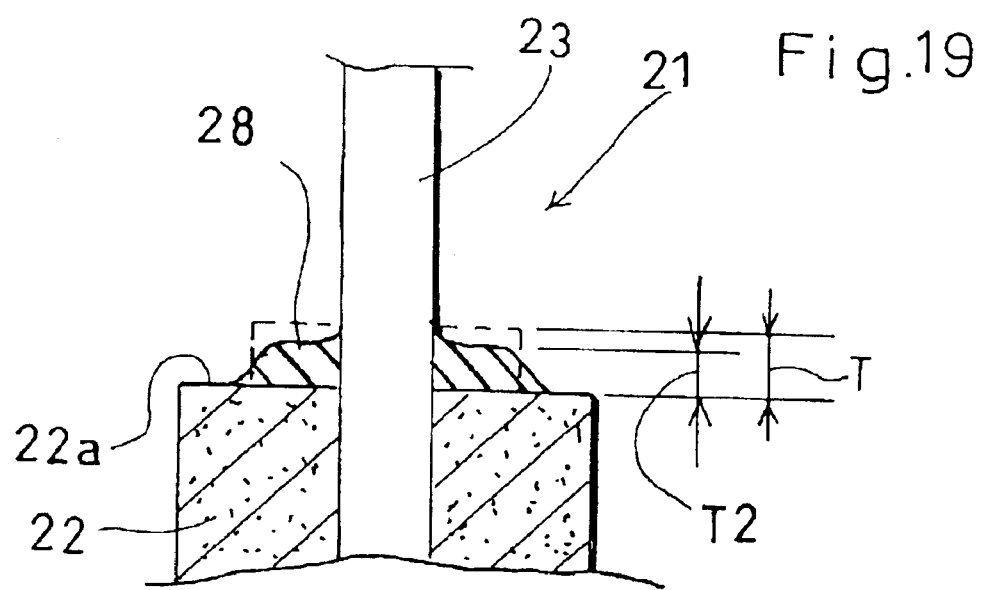
FIG. 19 is a vertical section, as viewed from the front side, illustrating the state after the ring member fitted around the anode wire is thermally melted in the second embodiment.

According to the experiment by the inventors of the present invention, when the diameter d of the anode wire 23 is 200 microns whereas the inner diameter d of the ring member 28 to be fitted thereto is 240–320 microns, i.e. only when the inner diameter of the ring member 28 is 1.2–1.6 times the diameter d0 of the anode wire 23, the projecting height from the end surface 22a of the anode chip 22 can be made smaller than the original thickness T of the ring member 28 with the ring member closely adhering to both of the end surface 22a of the anode chip body 22 and the outer circumferential surface of the anode wire 23 without any gap, as shown in FIG. 19.

When the inner diameter d of the ring member 28 is smaller than 1.2 times the diameter d0 of the anode wire 23, the projecting height T2' does not become smaller than the original height T of the ring member 28. Conversely, when the inner diameter d of the ring member 28 is larger than 1.6 times the diameter d of the anode wire 23, the adhesion to the outer circumferential surface of the anode wire 23 is weak.

Since the ring member 28 is made of a transparent synthetic resin, whether or not the ring member has closely adhered to both of the anode chip body 22 and the anode wire 23 by the thermal melting can be easily confirmed from the outside.

Subsequently, similarly to the prior art method, the anode chip body 22 undergoes the anodization process as shown in FIG. 4, so that a dielectric film of tantalum pentoxide, for example, is formed on the surfaces of metal particles of the anode chip body 22. At that time, a dielectric film of e.g. tantalum pentoxide is formed also at the root portion of the anode wire 13 connected to the anode chip body 22.

The anodization process for forming a dielectric film may be performed before fitting and thermally melting the ring member 28.

Subsequently, similarly to first embodiment, a solid electrolyte layer of metal oxide such as manganese dioxide is formed on a surface of the dielectric film of the anode chip body 22, as shown in FIG. 14.

As described above, in addition to the formation of the ring member 28 using a water-repellent synthetic resin, the ring member adheres closely to both of the end surface 22a of the anode chip body 22 and the outer circumferential surface of the anode wire 23 without a gap. Therefore, in the process step of forming a solid electrolyte layer, it is possible to reliably prevent the aqueous solution of manganese nitrate as a solid electrolyte forming solution from passing between the ring member 28 and the anode chip body 22 to reach the upper surface side of the ring member 28. Accordingly, it is possible to reliably prevent the formation of a solid electrolyte layer at a portion of the anode wire 23 on the upper surface side of the ring member 28 as connected to the solid electrolyte layer on the anode chip body 22.

Similarly to the prior art method, after the formation of the solid electrolyte layer is completed in this way, a cathode electrode film 4 comprising a graphite layer as a base layer and a metal layer of e.g. silver or nickel as an upper layer is formed on the surface of the anode chip body 22 except for the end surface 22a, thereby providing a complete capacitor element 21.

Figure 20:
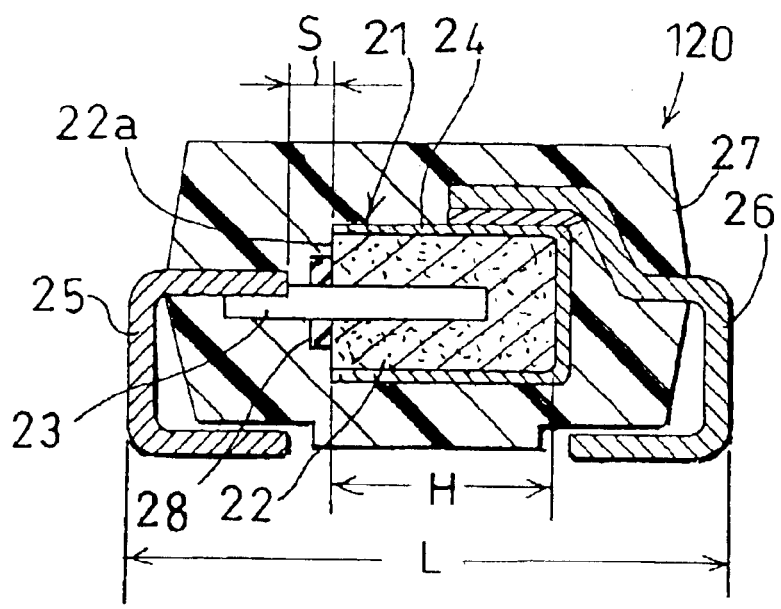
FIG. 20 is a vertical section, as viewed from the front side, illustrating a solid electrolytic capacitor according to the second embodiment.

As shown in FIG. 20, the capacitor element 21 thus formed is disposed between a pair of lead terminals 25 and 26 for assembling into a solid electrolytic capacitor 120. In disposing the capacitor element, the anode wire 23 is connected to the anode lead terminal 25 by welding for example, whereas the cathode electrode film 24 is electrically connected directly to the cathode lead terminal 26, and the entirety is sealed in a package 27 made of synthetic resin.

Figure 21:
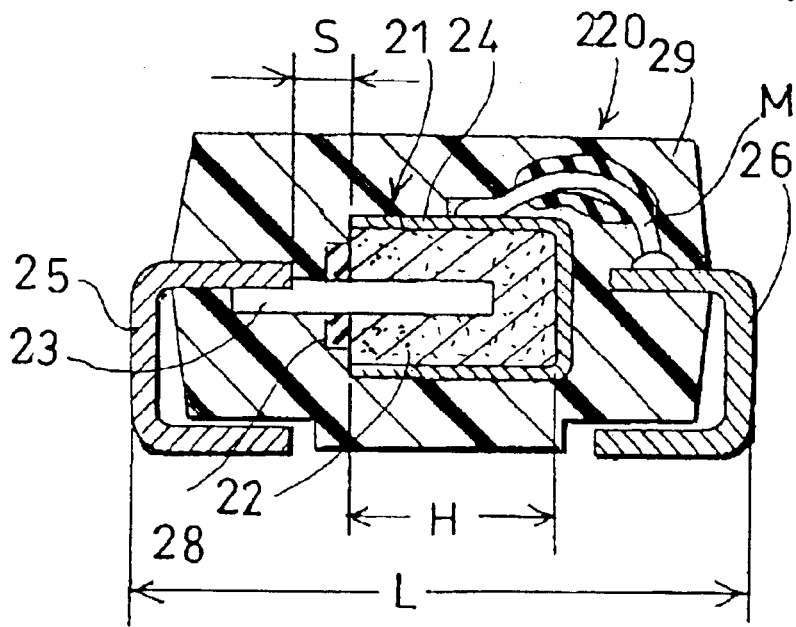
FIG. 21 is a vertical section, as viewed from the front side, illustrating a solid electrolytic capacitor with a safety fuse according to the second embodiment.

Alternatively, as shown in FIG. 21, the capacitor element 21 is disposed between a pair of lead terminals 25 and 26 for assembling into a solid electrolytic capacitor 220 with a safety fuse. In disposing the capacitor element, the anode wire 23 is connected to the anode lead terminal 25 by welding for example, whereas the cathode electrode film 24 is electrically connected to the cathode lead terminal 26 via a safety fuse wire M, and the entirety is sealed in a package 29 made of synthetic resin.

As described before, in the capacitor element 21 to be assembled into the solid electrolytic capacitor 120, 220, the projecting height T2 of the ring member from the end surface 22a of the anode chip body 22 can be made smaller than the original height T of the ring member 15 while reducing the infiltration of synthetic resin into the porous structure of the anode chip body 22.

Therefore, the neck dimension S from the end surface 22a of the anode chip body 22 to the anode lead terminal 25 can be decreased by as much as the decreased a mount of the projecting height T2 of the ring member 28 from the end surface 22a. Therefore, in the case where the entire length L of the completed solid electrolytic capacitor 100, 200 is determined in advance, the length H of the anode chip body 22 can be increased by as much as the decreased amount of the neck dimension S, thereby increasing the capacitance of the capacitor.

In the case where the capacitance is determined in advance, the entire length L of the solid electrolytic capacitor 120, 220 can be shortened by as much as the decreased amount of the neck dimension S, thereby decreasing the size and weight of the capacitor.

Next, a capacitor element 31 according to a third embodiment of the present invention, which is applied to a tantalum solid electrolytic capacitor, will be described with reference to the drawings (FIGS. 22–26).

Figure 22:
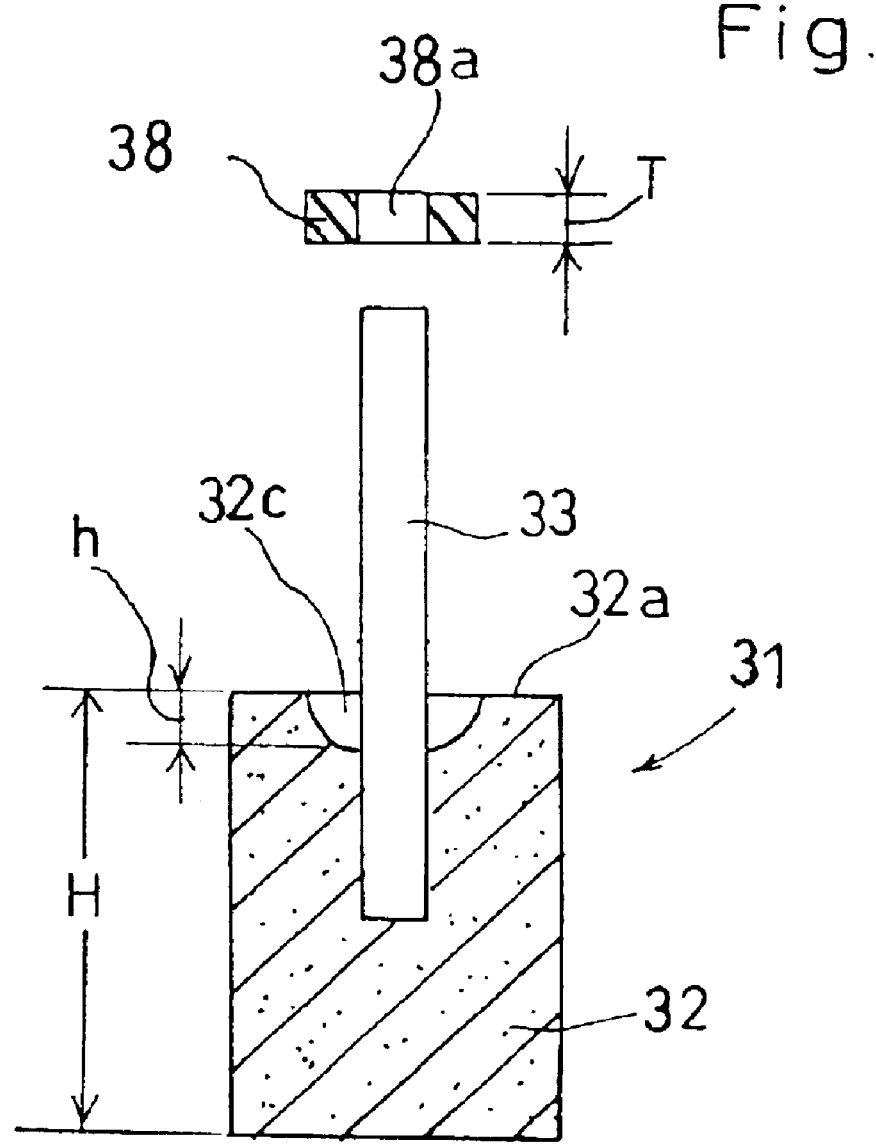
FIG. 22 is a vertical section, as viewed from the front side, illustrating an anode chip body and a ring member according to a third embodiment.

First, as shown in FIG. 22, First, tantalum powder is compacted into a porous anode chip body 32 and sintered, while anode wire 33 of tantalum is provided to project from an end surface 32a of the anode chip body 32.

In forming the anode chip body 32 by compacting, a recess 32c having a depth h is formed at the end surface 32a to surround the anode wire 33 projecting from the end surface 32a.

Figure 23:
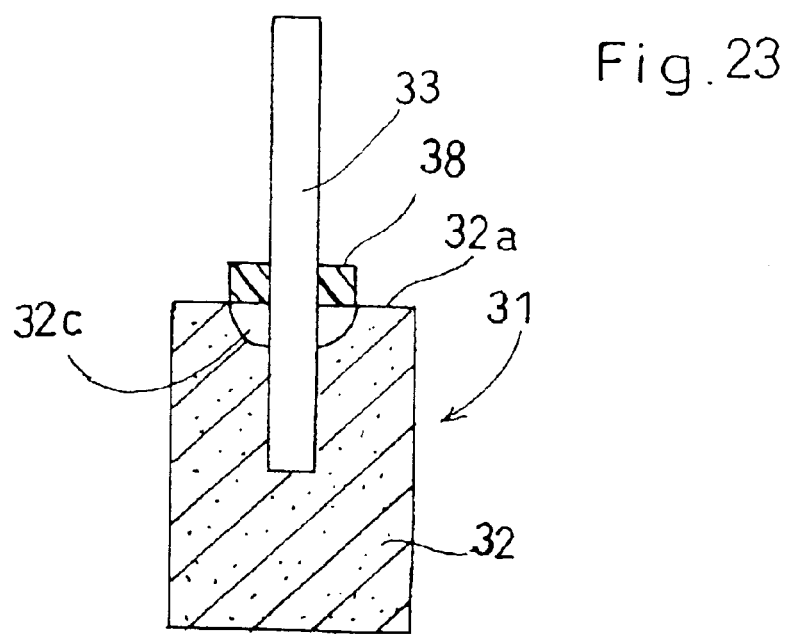
FIG. 23 is a vertical section, as viewed from the front side, illustrating the ring member as fitted around a root portion of the anode wire of the anode chip body in the third embodiment.

On the other hand, a ring member 38 having a thickness T and formed with a through-hole 38a as shown in FIG. 22 is formed by punching a plate member made of water-repellent transparent thermoplastic synthetic resin such as fluoroplastic having a melting point of about 270° C. for example. Then, as shown in FIG. 23, the ring member 38 is fitted around a root portion of the anode wire 33 connected to the end surface 32a of the anode chip body 32.

Subsequently, with the end surface 32a oriented upward, the entirety of the anode chip body 32 is put in a non-illustrated closed container and heated to a temperature equal to or higher than the melting point of the synthetic resin forming the ring member 38, or specifically to about 270–300° C. for example, while maintaining the inside of the closed container under vacuum or in an atmosphere of inert gas such as nitrogen gas or argon gas. After maintaining the temperature for about 30 minutes, cooling to ordinary temperature is performed.

Figure 24:
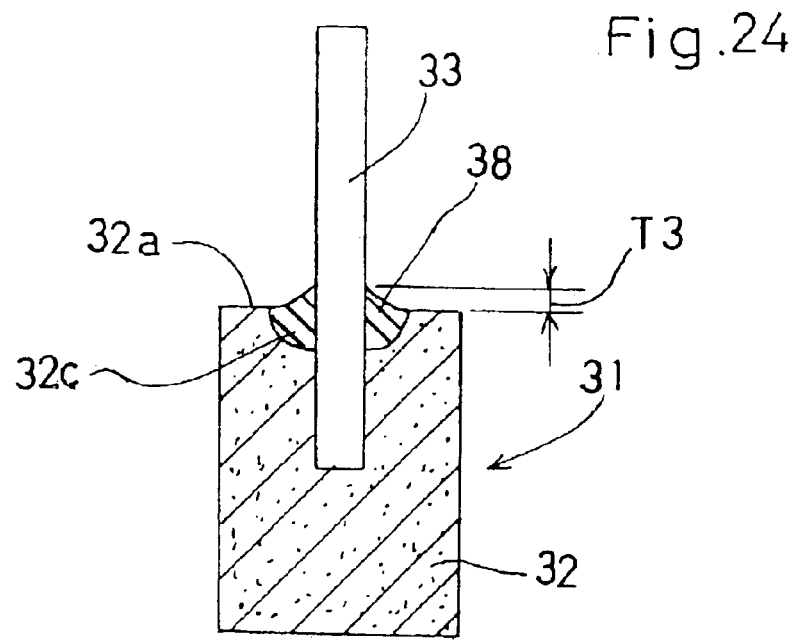
FIG. 24 is a vertical section, as viewed from the front side, illustrating the state after the ring member fitted around the anode wire is thermally melted in the third embodiment.

As shown in FIG. 24, the ring member 38 temporarily melts by the heating and partially flows into the recess 32c at the end surface 32a of the anode chip body 32 to fill the recess. Thus, the ring member adheres closely to both of the anode chip body 32 and the anode wire 33 without a gap as if thermally fused thereto. At that time, the projecting height T3 of the ring member 38 from the end surface 32a becomes smaller than the original thickness T of the ring member 38.

In this case, when the depth h of the recess 32c is made generally equal to the thickness T of the ring member 38, the ring member 38 does not project from the end surface 32a of the anode chip body 32 almost at all.

Since the ring member 38 is made of a transparent synthetic resin, whether or not the ring member closely adheres to both of the anode chip body 32 and the anode wire 33 by the thermal melting can be confirmed from the outside.

Since the ring member 38 is loaded in the recess 32c by thermally melting the ring member 38, the infiltration of the molten synthetic resin into the porous structure of the anode chip body 32 can be prevented or considerably reduced as compared with the case where a synthetic resin dissolved in a solvent is loaded in the recess.

Subsequently, similarly to the prior art method, the anode chip body 32 undergoes the anodization process as shown in FIG. 4, so that a dielectric film of tantalum pentoxide, for example, is formed on the surfaces of metal particles of the anode chip body 32. At that time, a dielectric film of e.g. tantalum pentoxide is formed also at the root portion of the anode wire 33 connected to the anode chip body 32.

The anodization process for forming the dielectric film may be performed before fitting and thermally melting the ring member 38.

Subsequently, similarly to first embodiment, a solid electrolyte layer of metal oxide such as manganese dioxide is formed on a surface of the dielectric film of the anode chip body 32, as shown in FIG. 14.

As described above, in addition to the formation of the ring member 38 using a water-repellent synthetic resin, the ring member adheres closely to both of the anode chip body 32 and the anode wire 33 without a gap. Therefore, in the process step of forming a solid electrolyte layer, it is possible to reliably prevent the aqueous solution of manganese nitrate as a solid electrolyte forming solution from passing between the ring member 38 and the anode chip body 32 or the anode wire 33 to reach the upper surface side of the ring member 38. Accordingly, it is possible to reliably prevent the formation of a solid electrolyte layer at a portion of the anode wire 32 on the upper surface side of the ring member 38 as connected to the solid electrolyte layer on the anode chip body 32.

Similarly to the prior art method, after the formation of the solid electrolyte layer is completed in this way, a cathode electrode film 34 comprising a graphite layer as a base layer and a metal layer of e.g. silver or nickel as an upper layer is formed on the surface of the anode chip body 32 except for the end surface 32a, thereby providing a complete capacitor element 31.

Figure 25:
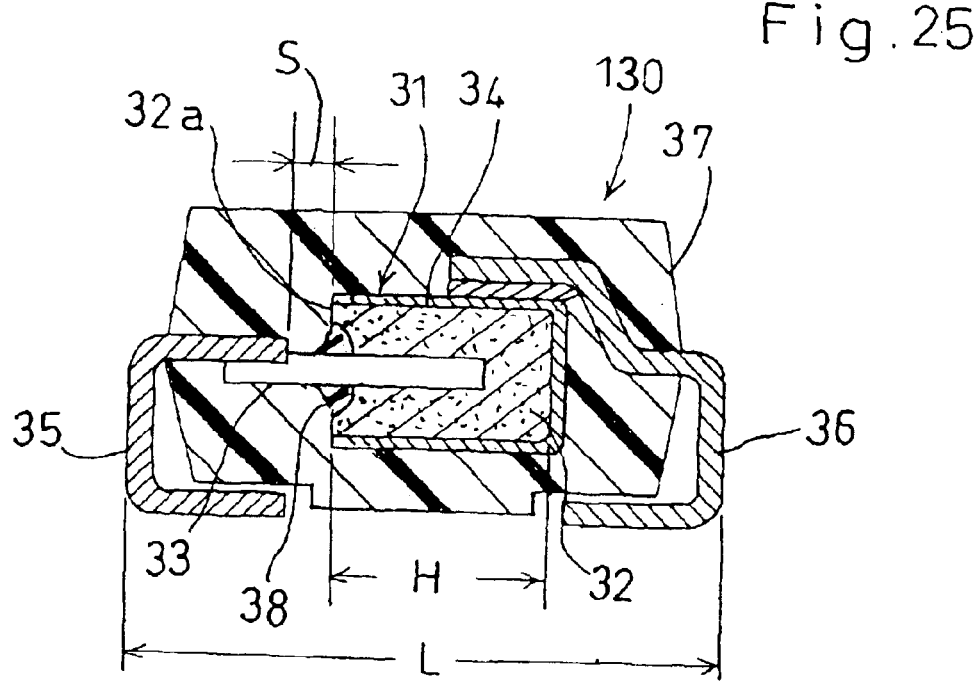
FIG. 25 is a vertical section, as viewed from the front side, illustrating a solid electrolytic capacitor according to the third embodiment.

As shown in FIG. 25, the capacitor element 31 thus formed is disposed between a pair of lead terminals 35 and 36 for assembling into a solid electrolytic capacitor 130. In disposing the capacitor element, the anode wire 33 is connected to the anode lead terminal 35 by welding for example, whereas the cathode electrode film 34 is electrically connected directly to the cathode lead terminal 36, and the entirety is sealed in a package 37 made of synthetic resin.

Figure 26:
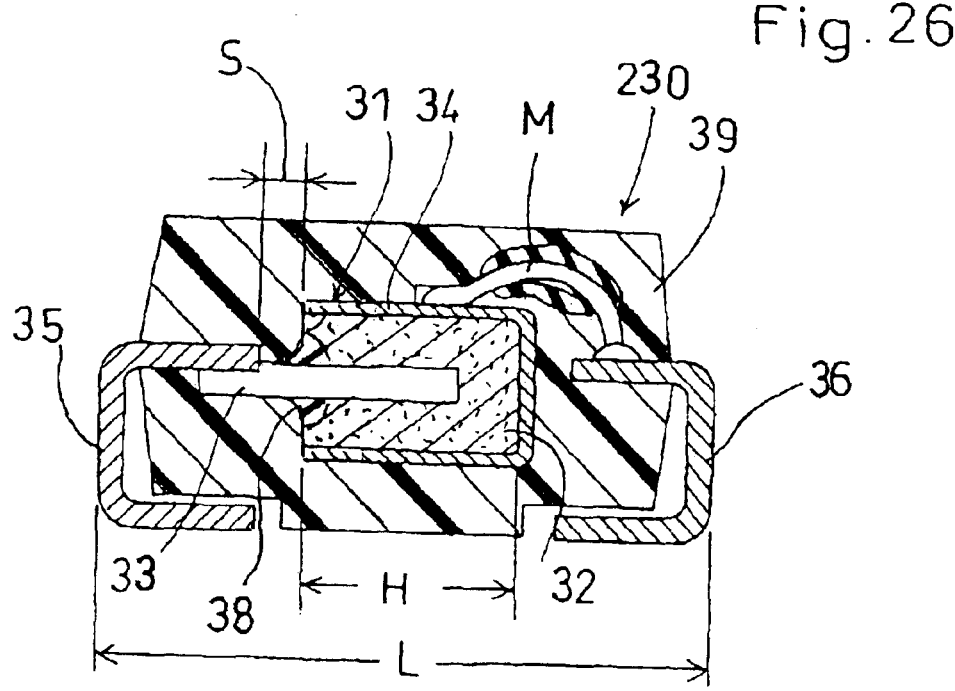
FIG. 26 is a vertical section, as viewed from the front side, illustrating a solid electrolytic capacitor with a safety fuse according to the third embodiment.

Alternatively, as shown in FIG. 26, the capacitor element 31 is disposed between a pair of lead terminals 35 and 36 for assembling into a solid electrolytic capacitor 230 with a safety fuse. In disposing the capacitor element, the anode wire 33 is connected to the anode lead terminal 35 by welding for example, whereas the cathode electrode film 34 is electrically connected to the cathode lead terminal 36 via a safety fuse wire M, and the entirety is sealed in a package 39 made of synthetic resin.

As described before, in the capacitor element 31 to be assembled into the solid electrolytic capacitor 130, 230, the projecting height T3 of the ring member 28 from the end surface 32a of the anode chip body 32 can be made smaller than the original thickness T of the ring member 28 while reducing infiltration of synthetic resin into the porous structure of the anode chip body 32.

Therefore, the neck dimension S from the end surface 32a of the anode chip body 32 to the anode lead terminal 35 can be decreased by as much as the decreased amount of the projecting height T3 of the ring member 38 from the end surface 32a. Therefore, in the case where the entire length L of the completed solid electrolytic capacitor 130, 230 is determined in advance, the length H of the anode chip body 32 can be increased by as much as the decreased amount of the neck dimension S, thereby increasing the capacitance of the capacitor.

In the case where the capacitance is determined in advance, the entire length L of the solid electrolytic capacitor 130, 230 can be shortened by as much as the decreased amount of the neck dimension S, thereby decreasing the size and weight of the capacitor.

Next, a capacitor element according to a fourth embodiment of the present invention, which is applied to a tantalum solid electrolytic capacitor, will be described with reference to the drawings (FIGS. 27–34).

Figure 27:
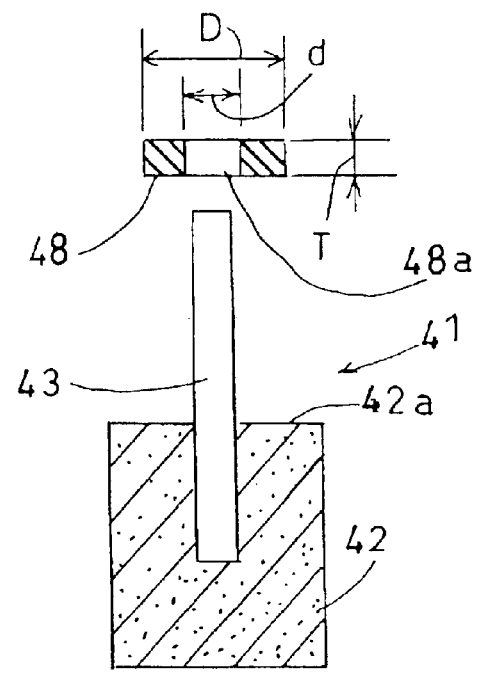
FIG. 27 is a vertical section, as viewed from the front side, illustrating an anode chip body and a ring member in a fourth embodiment.

First, as shown in FIG. 27, tantalum powder is compacted into a porous anode chip body 42 and sintered, while anode wire 43 of tantalum is provided to project from an end surface 42a of the anode chip body 42.

Figure 28:
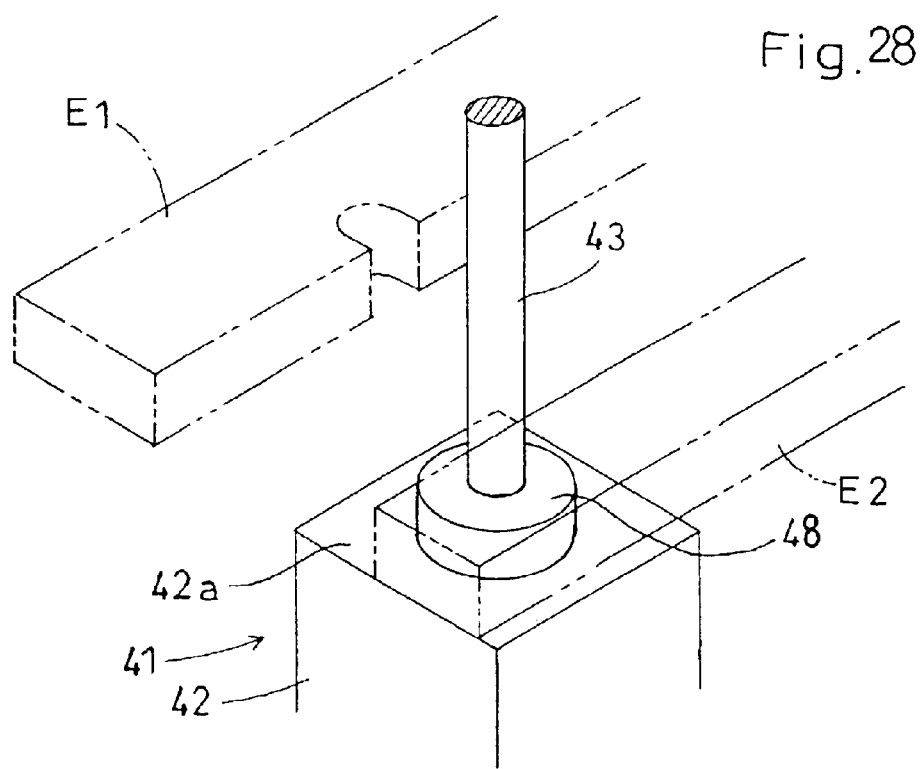
FIG. 28 is a vertical section, as viewed from the front side, illustrating the ring member as fitted around a root portion of the anode wire in the fourth embodiment.
Figure 29:
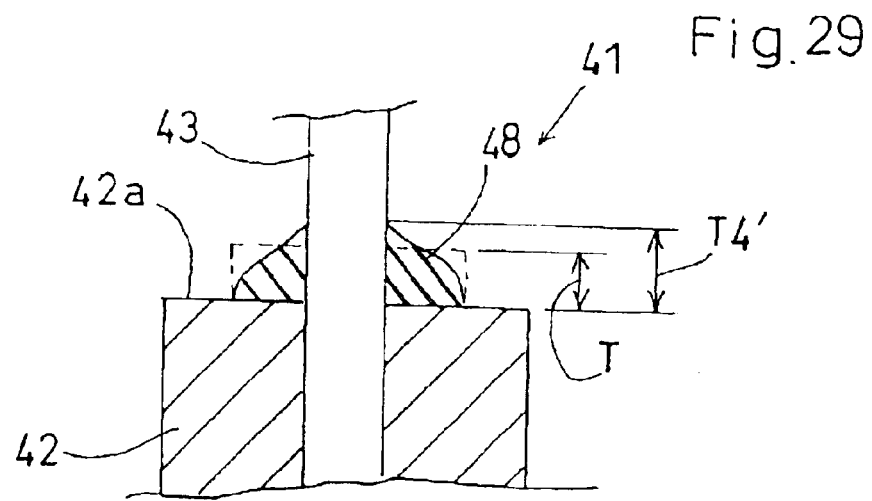
FIG. 29 is a vertical section, as viewed from the front side, illustrating the state after the ring member fitted around the anode wire is thermally melted in the fourth embodiment.

On the other hand, as shown in FIG. 27, a ring member 48 having a thickness T and a diameter D and formed with a through-hole 48a having an inner diameter d is formed by punching a plate member made of a transparent thermoplastic synthetic resin which is water-repellent and heat-shrinkable such as fluoroplastic having a melting point of about 270° C.' for example. As shown in FIGS. 28 and 29, the ring member 48 is fitted around a root portion of the anode wire 43 connected to the end surface 42a of the anode chip body 42.

Subsequently, the anode chip body 42 is put in a non-illustrated closed container with the end surface 42a oriented upward and heated to a temperature equal to or higher than the melting point of the synthetic resin forming the ring member 48, or specifically to about e.g. 270–300 ° C. for melting the ring member 48 while maintaining the inside of the closed container under vacuum or in an atmosphere of inert gas such as nitrogen gas or argon gas. After maintaining the melted state for about 30 minutes, cooling to ordinary temperature is performed.

By the thermal melting of the ring member 48, the ring member 48 deforms into a configuration fitting to the irregular end surface 42a of the anode chip body 42 and adheres closely to the end surface 42a without a gap as if thermally fused to the end surface while avoiding or considerably reducing filtration into the porous structure as compared with the case where a synthetic resin dissolved in a solvent is applied. At that time, the ring member also adheres closely to the outer circumferential surface of the anode wire 43 without a gap as if thermally fused thereto.

Since the ring member 48 is formed of a thermoplastic synthetic resin which is heat-shrinkable, the heating process causes the ring member to shrink toward the anode wire 43 while reducing the inner diameter d, so that the ring member closely adheres to the outer circumferential surface of the anode wire 43 more strongly.

The shrinkage of the ring member 48 toward the outer circumferential surface of the anode wire 43 due to the heating ensures strong and reliable adhesion to the outer circumferential surface of the anode wire 43. On the other hand, however, the portion of the ring member 48 contacting the outer circumferential surface of the anode wire 43 rises upward from the end surface 42a of the anode chip body 42, as shown in FIG. 29. As a result, the projecting height T4' from the end surface 2a becomes larger than the original thickness T of the ring member 48.

Figure 30:
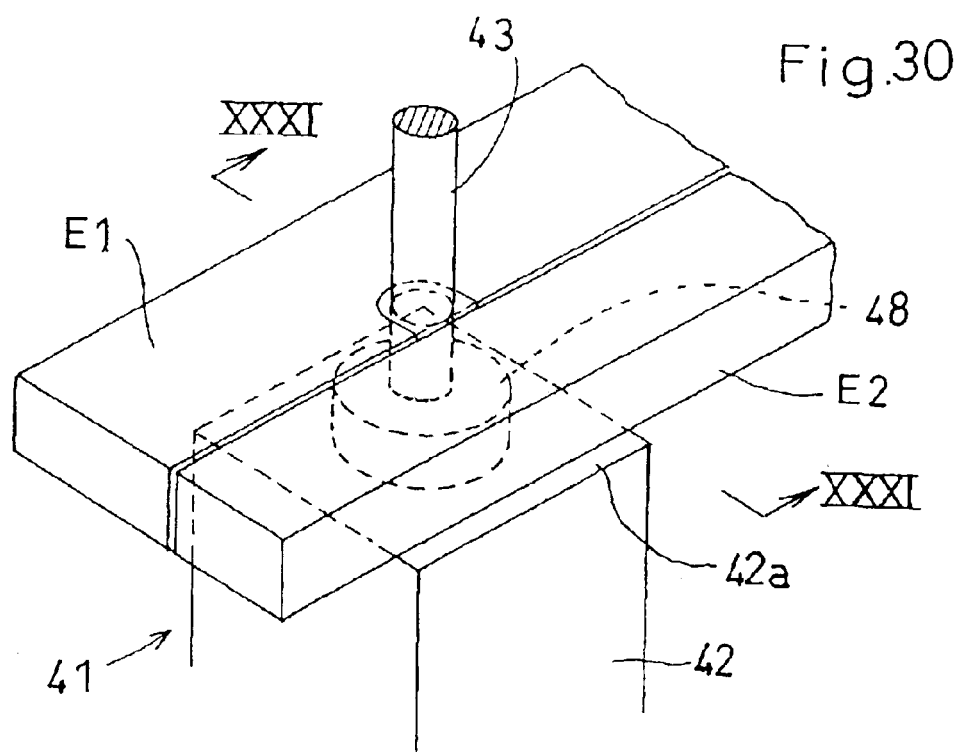
FIG. 30 is a perspective view illustrating the ring member being thermally melted and pressed in the fourth embodiment.
Figure 31:
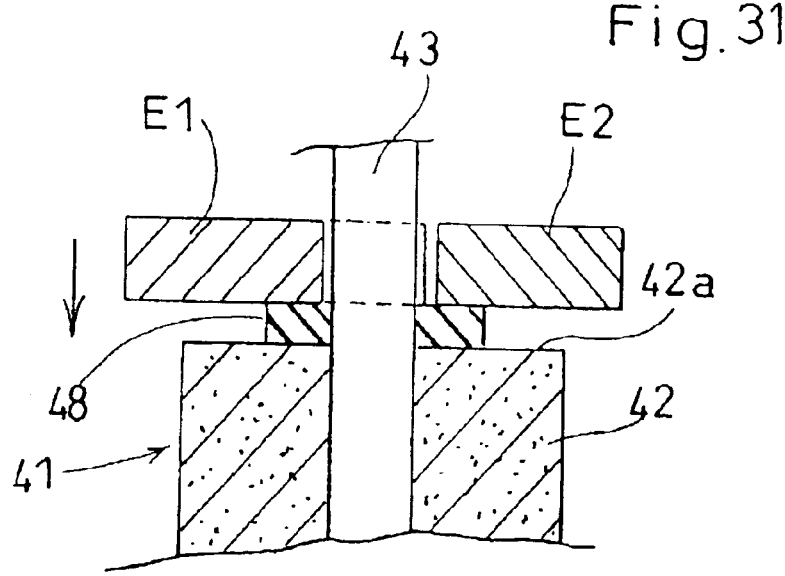
FIG. 31 is a sectional view taken along XXXI—XXXI in FIG. 30.

In the fourth embodiment, therefore, the ring member 48 in the molten state is pressed against the end surface 42a of the anode chip body 42 with a pair of pressing pieces E1 and E2 arranged to be openable and closable sideways for sandwiching the anode wire 43, as shown in FIGS. 30 and 31.

Figure 32:
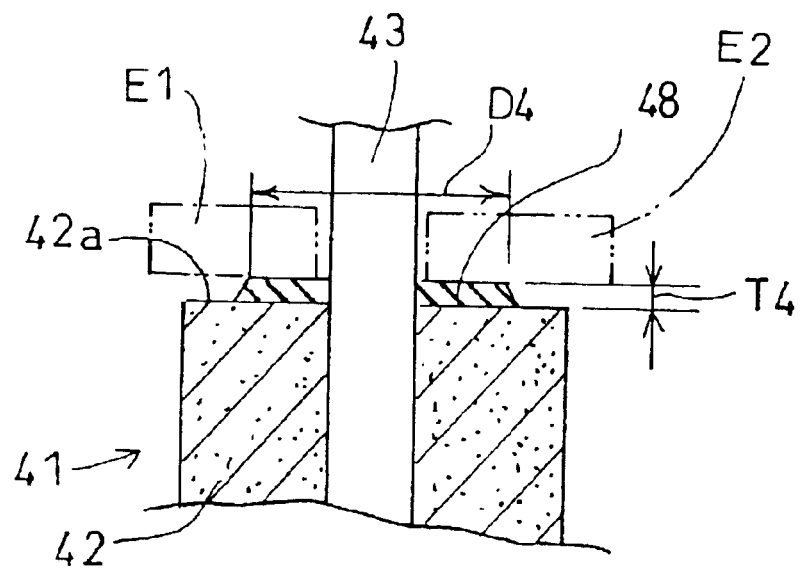
FIG. 32 is a vertical section, as viewed from the front side, illustrating the ring member after thermally melted and pressed in the fourth embodiment.

As shown in FIG. 32, the pressed ring 48 deforms to increase its diameter D to D4 while reducing the thickness T. Therefore, by cooling the ring member in the pressed state to ordinary temperature, the projecting height T4 of the ring member from the end surface 42a can be made smaller than the original thickness T of the ring member. Further, the adhesion to the end surface 42a of the anode chip body 42 can be enhanced.

Since the ring member 48 is made of a transparent synthetic resin, whether or not the ring member closely adheres to both of the anode chip body 42 and the anode wire 43 by the thermal melting can be easily confirmed from the outside.

Subsequently, similarly to the prior art method, the anode chip body 42 undergoes the anodization process as shown in FIG. 4, so that a dielectric film of tantalum pentoxide, for example, is formed on the surfaces of metal particles of the anode chip body 42. At that time, a dielectric film of e.g. tantalum pentoxide is formed also at the root portion of the anode wire 43 connected to the anode chip body 42.

The anodization process for forming the dielectric film may be performed before fitting and thermally melting the ring member 48 while pressing the ring member.

Subsequently, similarly to first embodiment, a solid electrolyte layer of metal oxide such as manganese dioxide is formed on a surface of the dielectric film of the anode chip body 42, as shown in FIG. 14.

As described above, in addition to the formation of the ring member 48 using a water-repellent synthetic resin, the ring member adheres closely to both of the end surface 42a of the anode chip body 42 and the outer circumferential surface of the anode wire 43 without a gap. Therefore, in the step of forming a solid electrolyte layer, it is possible to reliably prevent the aqueous solution of manganese nitrate as a solid electrolyte forming solution from passing between the ring member 48 and the anode chip body 42 to reach the upper surface side of the ring member 48. Accordingly, it is possible to reliably prevent the formation of a solid electrolyte layer at a portion of the anode wire 42 on the upper surface side of the ring member 48 as connected to the solid electrolyte layer on the anode chip body 42.

In this case, since the ring member 48 is made of a heat-shrinkable thermoplastic synthetic resin and hence strongly adheres to the outer circumferential surface of the anode wire 43 without a gap by thermal melting, the aqueous solution of manganese nitrate as a solid electrolyte forming solution is more reliably prevented from passing between the ring member 48 and the anode chip body 42 or the anode wire 43 to reach the upper surface side of the ring member 48. Accordingly, it is possible to more reliably prevent the formation of a solid electrolyte layer at a portion of the anode wire 42 on the upper surface side of the ring member 48 as connected to the solid electrolyte layer on the anode chip body 42.

Similarly to the prior art method, after the formation of the solid electrolyte layer is completed in this way, a cathode electrode film 4 comprising a graphite layer as a base layer and a metal layer of e.g. silver or nickel as an upper layer is formed on the surface of the anode chip body 42 except for the end surface 42a, thereby providing a complete capacitor element 41.

Figure 33:
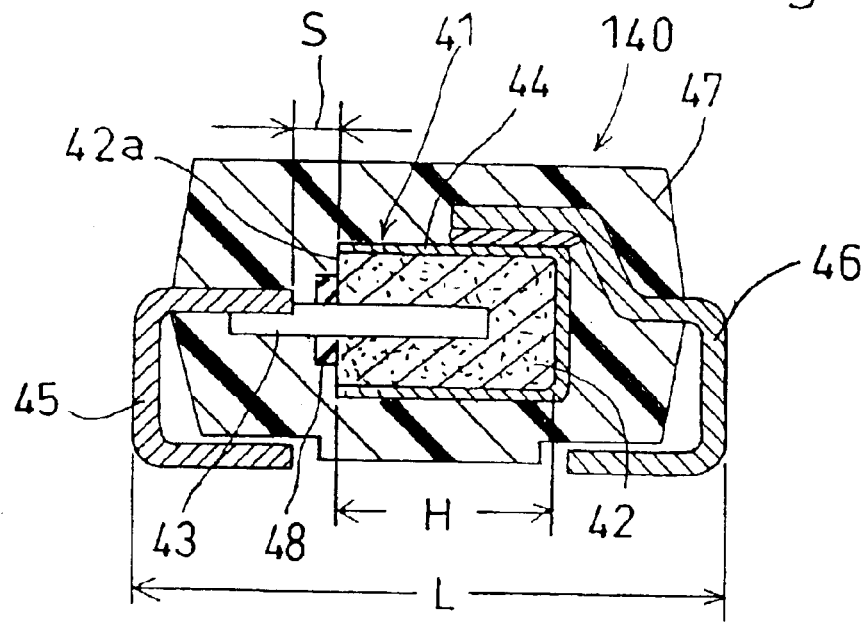
FIG. 33 is a vertical section, as viewed from the front side, illustrating a solid electrolytic capacitor according to the fourth embodiment.

As shown in FIG. 33, the capacitor element 41 thus formed is disposed between a pair of lead terminals 45 and 46 for assembling into a solid electrolytic capacitor 140. In disposing the capacitor element, the anode wire 43 is connected to the anode lead terminal 45 by welding for example, whereas the cathode electrode film 4 is electrically connected directly to the cathode lead terminal 46, and the entirety is sealed in a package 47 made of synthetic resin.

Figure 34:
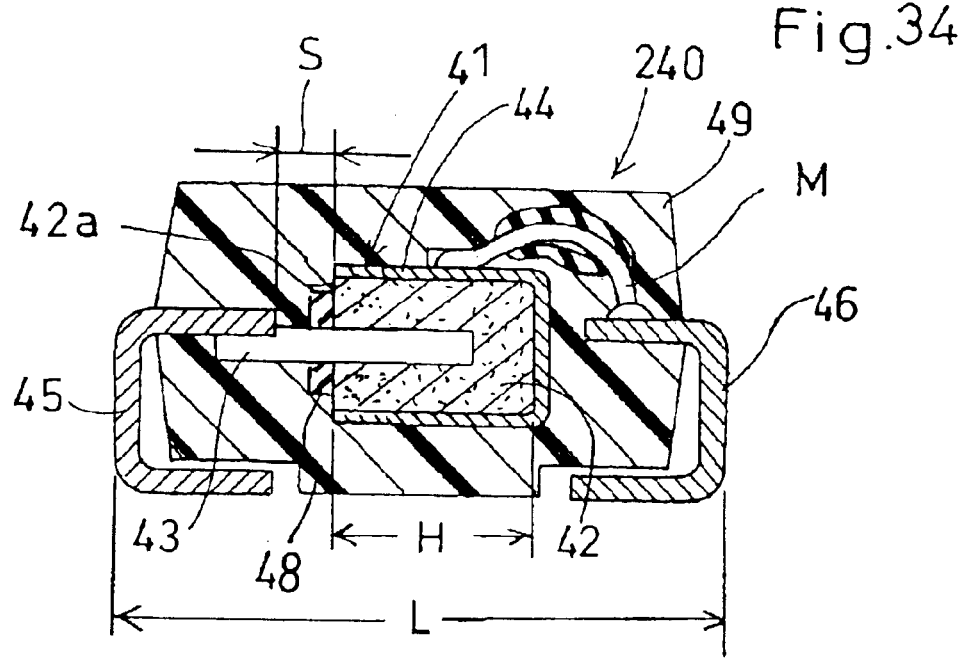
FIG. 34 is a vertical section, as viewed from the front side, illustrating a solid electrolytic capacitor with a safety fuse according to the fourth embodiment.

Alternatively, as shown in FIG. 34, the capacitor element 41 is disposed between a pair of lead terminals 45 and 46 for assembling into a solid electrolytic capacitor 240 with a safety fuse. In disposing the capacitor element, the anode wire 43 is connected to the anode lead terminal 45 by welding for example, whereas the cathode electrode film 4 is electrically connected to the cathode lead terminal 46 via a safety fuse wire M, and the entirety is sealed in a package 49 made of synthetic resin.

As described before, in the capacitor element 41 to be assembled into the solid electrolytic capacitor 140, 240, the projecting height T4 of the ring member 48 from the end surface 42a of the anode chip body 42 can be made smaller than the original thickness T of the ring member 48 while reducing the infiltration of synthetic resin into the porous structure of the anode chip body 42.

Therefore, the neck dimension S from the end surface 42a of the anode chip body 42 to the anode lead terminal 45 can be decreased by as much as the decreased amount of the projecting height T4 of the ring member 48 from the end surface 42a. Therefore, in the case where the entire length L of the completed solid electrolytic capacitor 140, 240 is determined in advance, the length H of the anode chip body 42 can be increased by as much as the decreased amount of the neck dimension S, thereby increasing the capacitance of the capacitor.

In the case where the capacitance is determined in advance, the entire length L of the solid electrolytic capacitor 140, 240 can be shortened by as much as the decreased amount of the neck dimension S, thereby decreasing the size and weight of the capacitor.

What is claimed is:

1. A capacitor element for a solid electrolytic capacitor comprising: an anode chip body formed by sintering valve metal powder; an anode wire projecting from an end surface of the anode chip body; and a ring member made of a water-repellent thermoplastic synthetic resin and fitted around a root portion of the anode wire connected to the anode chip body;

wherein the ring member is thermally melted in the fitted state around the anode wire, the thermally melted ring member having a flaring base portion for fusing to the end surface of the anode chip body, the thermally melted ring member also having a plateau spaced from the end surface of the anode chip body for fusing to the anode wire.

2. The capacitor element for a solid electrolytic capacitor according to claim 1, wherein the ring member is made of a transparent synthetic resin.

3. The capacitor element for a solid electrolytic capacitor according to claim 1, wherein the ring member is formed with a cutout extending radially outward from a throughhole of the ring member to reach an outer circumferential surface of the ring member.

4. A capacitor element for a solid electrolytic capacitor comprising: an anode chip body formed by sintering valve metal powder; an anode wire projecting from an end surface of the anode chip body; and a ring member made of a water-repellent thermoplastic synthetic resin and fitted around a root portion of the anode wire connected to the anode chip body;

wherein the end surface of the anode chip body is formed with a recess surrounding the anode wire, the ring member being thermally melted to have an anchor portion filled in the recess, the thermally melted ring member also having a tapering portion projecting beyond the recess for fusing to the anode wire.

5. A solid electrolytic capacitor comprising: a capacitor element disposed between an anode lead terminal and a cathode lead terminal; the capacitor element comprising an anode chip body made by sintering valve metal powder, an anode wire projecting from an end surface of the anode chip body, and a cathode electrode film formed on the anode chip body via a dielectric film and a solid electrolyte layer; the anode wire of the capacitor element being connected to the anode lead terminal whereas the cathode electrode film being electrically connected to the cathode lead terminal;

wherein the anode wire has a root portion which is connected to the anode chip body and around which a ring member made of a water-repellent thermoplastic synthetic resin is fitted, the ring member being thermally melted in the fitted state around the anode wire, the thermally melted ring member having a flaring base portion for fusing to the end surface of the anode chip body, the thermally melted ring member also having a plateau spaced from the end surface of the anode chip body for fusing to the anode wire.

6. A solid electrolytic capacitor comprising: a capacitor element disposed between an anode lead terminal and a cathode lead terminal; the capacitor element comprising an anode chip body made by sintering valve metal powder, an anode wire projecting from an end surface of the anode chip body, and a cathode electrode film formed on the anode chip body via a dielectric film and a solid electrolyte layer; the anode wire of the capacitor element being connected to the anode lead terminal whereas the cathode electrode film being electrically connected to the cathode lead terminal;

wherein the anode wire is provided with a ring member made of a water-repellent thermoplastic synthetic resin and fitted around the anode wire, the end surface of the anode chip body being formed with a recess surrounding the anode wire, the ring member being thermally melted to have an anchor portion filled in the recess the thermally melted ring member also having a tapering portion projecting beyond the recess for fusing to the anode wire.

7. A capacitor element for a solid electrolytic capacitor comprising: an anode chip body formed by sintering valve metal powder; an anode wire projecting from an end surface of the anode chip body; and a ring member made of a water-repellent thermoplastic synthetic resin and fitted around a root portion of the anode wire connected to the anode chip body;

wherein the ring member is thermally melted in the fitted state around the anode wire, and the ring member is formed with a cutout extending radially outward from a through-hole of the ring member to reach an outer circumferential surface of the ring member.

* * * * *